3,067,214
HALOETHISTERONE COMPOUNDS
Arthur E. Oberster, Canton, Ohio, Roger E. Beyler, Carbondale, Ill., and Lewis H. Sarett, Princeton, N.J., assignors to Merck & Co., Inc., Rahway, N.J., a corporation of New Jersey
No Drawing. Filed Apr. 20, 1960, Ser. No. 23,397
30 Claims. (Cl. 260—397.4)

This invention is concerned generally with novel steroids and processes of preparing the same. More particularly, it relates to novel 21-haloethisterones, 21-halonorethisterones, and closely related compounds which possess useful therapeutic properties as orally and parenterally active progestational agents. This invention also relates to pharmaceutical compositions containing these novel steroid compounds.

In accordance with the present invention, the novel 21-haloethisterones (17α-haloethynyl-4-androstene - 17β-ol-3-ones) and the 21-halonorethisterones (17α-haloethynyl-19-nor-17β-ol-3-ones) are prepared from a 17α-ethynyl-3-oxygenated-androstene-17β-ol by first protecting the oxygen functions present at the C-3 and C-17 positions of the steroid molecule with suitable protecting groups, and then halogenating to form the 17α-haloethynyl derivative. The protecting groups at C-3 and C-17 are then removed.

This process may be schematically represented as follows, starting with a 17α-ethynyl-4-androstene-17β-ol-3-one in which R is methyl, or the corresponding 19-norsteroid in which R is hydrogen:

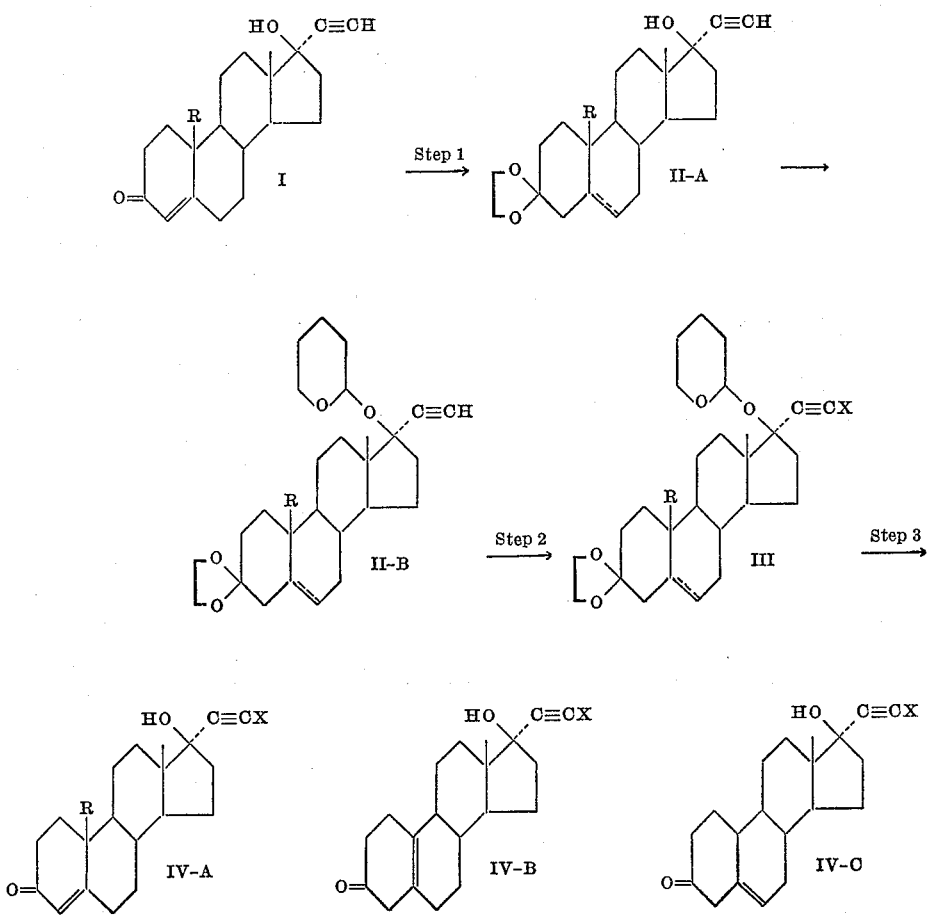

When starting with the 19-nor-17α-ethynyl-4-androstene-17β-ol-3-one, in which R is hydrogen, compound II-A (and likewise compounds II-B and III) are mixtures of the $\Delta^5$ and the $\Delta^{5(10)}$-androstenes, and in the case of the $\Delta^{5(10)}$ compound, the hydrogen (R) shown at C-10 is present at C-4. Removal of the protecting groups in step 3, using concentrated HCl gives only the 3-keto-$\Delta^4$-androstene (IV-A), but using approximately 70% aqueous acetic acid gives a mixture of the 3-keto-$\Delta^4$ (IV-A), the 3-keto-$\Delta^{5(10)}$-(IV-B) and the 3-keto-$\Delta^5$-androstenes, which compounds can be separated by chromatography.

When starting with the 17α-ethynyl-4-androstene-17β-ol-3-one, in which R is methyl, only the Δ⁵-androstene is present at II-A, II-B and III, and only the Δ⁴-androstene (IV-A) is formed in step 3.

The process may be schematically represented in the following manner, starting with a 17α-ethynyl-5-androstene-3β,17β-diol in which R is methyl, or the corresponding 19-nor-steroid in which R is hydrogen:

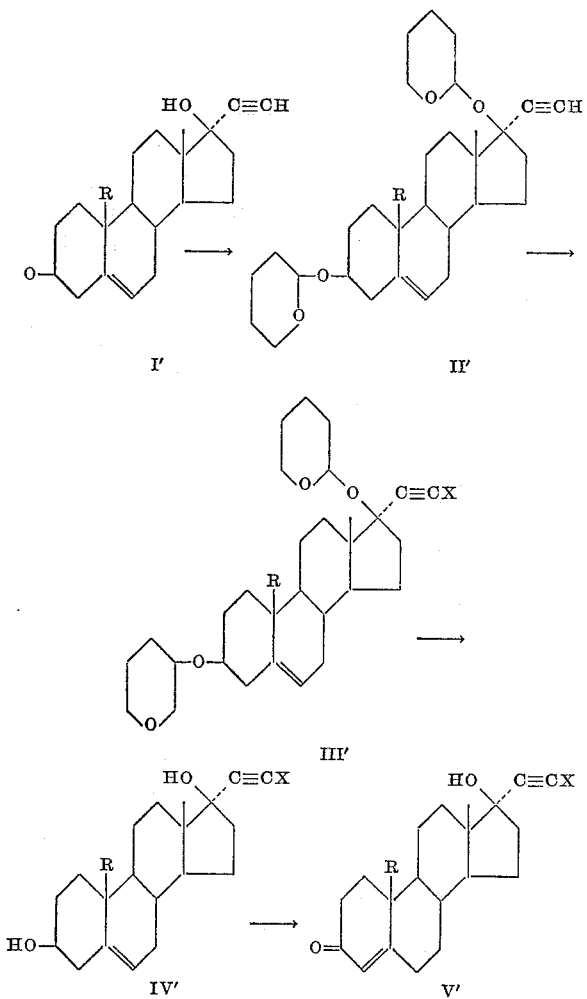

If the starting material is the 17α-ethynyl-5-androstene-3β,17β-diol (I'), the product (IV') which is obtained on removal of the protecting groups is the 17α-haloethynyl-5-androstene-3β,17β-diol. This compound may be converted into the 17α-haloethynyl-4-androstene-17β-ol-3-one (21-haloethisterone) by oxidation, for example, with aluminum isopropoxide in and cyclohexanone (or acetone) benzene. The choice of the 3-oxygenated-steroid used as starting material is based on practical considerations, availability and the like.

In the first step of our process the oxygen functions present at the C-3 and C-17 positions of the steroid molecule are protected. In a preferred embodiment of our invention a 3-keto group is blocked by forming the 3-ethylenedioxy-derivative by reaction with excess ethylene glycol in benzene, toluene or ethylene dichloride solvent in the presence of acid catalysts such as p-toluenesulfonic or sulfuric acid, the water by-product being continuously removed.

The 3-keto group may also be converted into the 3-ethylenedioxy derivative by exchange dioxolanation, which involves acid-catalyzed transfer of the ethylene glycol portion of simple 2,2-dialkyl-1,3-dioxolanes, such as 2,2'-dimethyl-1,3-dioxolane (acetone ethylene ketal) or, better, 2-methyl-2-ethyl-1,3-dioxolane (butanone ethylene ketal), on reaction of the ketones either in an inert solvent, as benzene, or simply in excess reagent.

Other cyclic ketal derivatives can be used in our process for protecting a ketone group at C-3. In general, we have found that the lower alkylenedioxy derivatives wherein the hydrocarbon group contains not more than seven carbon atoms, such as the ethylenedioxy, trimethylenedioxy, propylenedioxy and butylene dioxy derivatives are most suitable. However, in place of using a lower alkylenedioxy substituent to block or protect the keto substituent, we can use other derivatives readily hydrolyzable to keto, such as an enol ether monothioketal, or a dithioketal derivative for this purpose.

The 17β-ol group, and the 3β,17β-diol groups in the steroid molecule are protected by reaction with dihydropyran in the presence of an acidic reagent, such as p-toluenesulfonyl chloride, to form the corresponding tetrahydropyranyl ether. This reaction takes place, for example, on addition of p-toluenesulfonyl chloride to a solution of the steroid in an excess of dihydropyran. The reaction mixture is stirred at room temperature for 16 to 64 hours. The product may be recovered by neutralizing the reaction mixture with dilute base, and then extracting with ether. The ether extracts are washed with water, dried and evaporated to dryness. The crude product is dissolved in a solvent such as petroleum ether, and chromatographed over alumina to give the corresponding tetrahydropyranyl derivative.

In step 2 of our invention, the steroid starting material, protected at the 3- and the 17-positions as indicated above, is treated with a suitable halogenating agent. In the preferred embodiment of our invention, the steroid compound, dissolved in a tertiary alcohol, is first treated with a potassium alcoholate of that tertiary alcohol, to form the 21-potassium derivative of the steroid compound, and the latter compound is then halogenated.

To form the 21-chloro-derivative, the steroid is dissolved in t-butyl alcohol and treated with potassium-t-butoxide and then with t-butyl-hypochlorite.

To form the 21-bromo-derivative, the steroid is dissolved in t-butyl alcohol and treated with potassium t-butoxide and then with N-bromosuccinimide. The choice of the tertiary alcohol reagents is determined by practical considerations, such as availability, solubility and the like.

The 21-halo-steroid compounds are conveniently recovered by adding water to the reaction mixture, and extracting with ether. The ether extracts are then washed with water, dried, and evaporated to dryness in vacuo. The residual material thus obtained is separated by chromatography on alumina to afford the 21-halo-steroid.

In step 3 of our process, the protecting groups at C-3 and C-17 are removed, preferably by treatment with acid. Removal of the protecting groups using concentrated HCl gives the corresponding 3-keto-Δ⁴-androstene. To carry out this reaction, a solution of the steroid in methanol is stirred with concentrated HCl for approximately one hour at room temperature. The methanol may then be removed under reduced pressure. The steroid is conveniently recovered by ether extraction. The ether extract is dried, evaporated to dryness and the residual material crystallized from a suitable solvent.

When starting with the 19-nor-17α-ethynyl-4-androstene-17β-ol-3-one, in which R is hydrogen, removal of the protecting groups from the mixture of the 19-nor-Δ⁵ and Δ⁵⁽¹⁰⁾-androstenes present in III by treatment with approximately 70% aqueous acetic acid for about one hour at room temperature gives a mixture of the 3-keto-19-nor Δ⁴-, the 3-keto-19-nor-Δ⁵⁽¹⁰⁾, and the 3-keto-19-nor-Δ⁵ androstenes. These compounds can be separated by chromatography over acid-washed alumina and elution with mixtures of ether and petroleum ether.

The 17α - haloethynyl-5-androstene-3β,17β-diol (IV') may be converted into the 17α-haloethynyl-4-androstene-17β-ol-3-one (21-haloethisterone) (V') by oxidation with aluminum isopropoxide and cyclohexanone in benzene. This oxidation is carried out by dissolving the steroid in a solvent such as a mixture of cyclohexanone and benzene and reacting in an inert atmosphere with a solution of aluminum isopropoxide in benzene at 80–90° C. for 2–16 hours. To recover the product, the solution is cooled, a few drops of water are added, and the resulting aluminum hydroxide is filtered off. The filtrate is concentrated on the steam bath under reduced pressure, and the residual material is crystallized from a suitable solvent.

In accordance with the present invention, the novel 21-haloethisterones are prepared from the 17α-ethynyl-5-androstene-3β,17β-diol by first reacting the latter compound with dihydropyran in the presence of p-toluenesulfonyl chloride to give the 17α-ethynyl-5-androstene-3β,17β-diol-bis-tetrahydropyranyl ether.

The 17α-ethynyl-5-androstene-3β,17β-diol-bis - tetrahydropyranyl ether is chlorinated by dissolving in t-butyl alcohol and treating with a solution of potassium t-butoxide and then with t-butyl hypochlorite to give the 17α-chloroethynyl-5-androstene-3β,17β - diol - bis - tetrahydropyranyl ether. The latter compound is then hydrolyzed with concentrated HCl to give 17α-chloroethynyl-5-androstene-3β,17β-diol, which is then oxidized with aluminum isopropoxide and cyclohexanone in benzene to give the 17α-chloroethynyl-4-androstene-17β-ol-3-one (21-chloroethisterone).

The 17α-ethynyl-5-androstene-3β,17β-diol-bis - tetrahydropyranyl ether is brominated by dissolving the steroid in t-butyl alcohol and treating with a solution of potassium t-butoxide and then with N-bromosuccinimide to give the 17α-bromoethynyl-5-androstene-3β,17β - diol - bis - tetrahydropropanyl ether. The latter compound is then hydrolyzed with concentrated HCl to give 17α-bromoethynyl-5-androstene-3β,17β-diol, which is then oxidized with aluminum isopropoxide and cyclohexanone in benzene to give the 17α-bromoethynyl-4-androstene-17β - ol - 3 - one (21-bromo-ethisterone).

The novel 21-halonorethisterones are prepared from norethisterone (17α-ethynyl-19-nor-4-androstene-17β - ol-3-one) by reaction first with ethylene glycol in the presence of p-toluenesulfonic acid to give a mixture of the Δ⁵ and the Δ⁵⁽¹⁰⁾-17α-ethynyl-3-ethylenedioxy-19-nor-androstene-17β-ol, and then with dihydropyran to give the corresponding tetrahydropyranyl ether.

The mixture of the Δ⁵ and the Δ⁵⁽¹⁰⁾-17α-ethynyl-3-ethylenedioxy-19-nor-androstene-17β-ol tetrahydropyranyl ether is chlorinated by dissolving the steroid in t-butyl alcohol and treating with a solution of potassium t-butoxide and then with t-butylhypochlorite to give a mixture of the Δ⁵ and the Δ⁵⁽¹⁰⁾-17α-chloroethynyl-19-nor-androstene-17β-ol-3-one tetrahydropyranyl ether, which mixture is then hydrolyzed with acid. Hydrolysis of the mixture with concentrated HCl gives the 17α-chloroethynyl-19-nor-4-androstene-17β-ol-3-one (21-chloronorethisterone). Hydrolysis of the mixture with 70% aqueous acetic acid gives a mixture of the Δ⁴, the Δ⁵⁽¹⁰⁾ and the Δ⁵-17α-chloroethynyl-19-nor-androstene-17β-ol-3-ones, which mixture is separated by chromatography.

The mixture of the Δ⁵ and the Δ⁵⁽¹⁰⁾-17α-ethynyl-3-ethylenedioxy-19-nor-androstene - 17β - ol - tetrahydropyranyl ether is brominated by dissolving the steroid in t-butyl alcohol and treating with a solution of potassium t-butoxide and then with N-bromosuccinimide to give a mixture of the Δ⁵ and the Δ⁵⁽¹⁰⁾-17α-bromoethynyl-19-nor-androstene-17β-ol-3-one tetrahydropyranyl ether. The latter compound is then hydrolyzed with acid. Hydrolysis of the mixture with concentrated HCl gives the 17α-bromoethynyl-19-nor-4-androstene-17β-ol-3 - one (21-bromonorethisterone). Hydrolysis of the mixture with 70% aqueous acetic acid gives a mixture of the Δ⁴, the Δ⁵⁽¹⁰⁾ and the Δ⁵-17α-bromoethynyl-19-nor-androstene - 17β - ol - 3-ones, which mixture is separated by chromatography.

In addition to the above described 17α-haloethynyl-4-androstene-17β-ol-3-ones, this invention contemplates the preparation of certain derivatives thereof, and in particular the novel steroid compounds which may be chemically represented as follows:

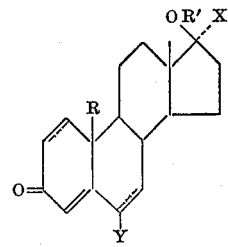

wherein the 1,2-positions and the 6,7-positions of the steroid molecule may be double bonded or saturated, and wherein R is hydrogen, a methyl group, R' is a lower alkyl or alkanoyl group, X is C≡CCl, C≡CBr, CH=CHCl, CH=CHBr, CH₂CH₂Br or CH₂CH₂Cl, and Y is methyl, chloro or fluoro.

This invention also contemplates the preparation of the 17β-lower alkyl esters and ethers of the 17α-halo ethynyl-19-nor-5(10)-androstene-17β-ol-3-ones, as well as the products which are formed on hydrogenating the 17α-haloethynyl group of the aforesaid compounds to the 17α-CH=CHX, and to the 17α-CH₂CH₂X groups, where X represents chlorine or bromine.

The 17α-haloethynyl group of the 21-haloethisterones and the 21-halonorethisterones (VI) is reduced to the corresponding chlorovinyl derivative (VI) on hydrogenation with a Lindlar catalyst, and to the corresponding chloroethyl derivative (VII) on hydrogenation using a heavy metal catalyst such as PtO₂.

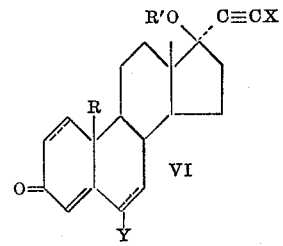

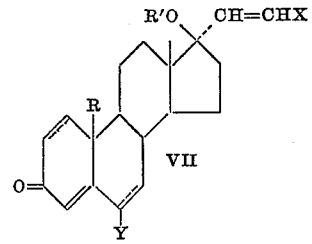

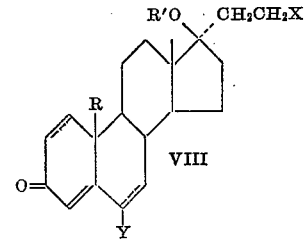

The 6α - methyl - 21 - haloethisterone is prepared by reacting the 17α-haloethynyl-5 - androstene - 3β,17β - diol with monoperphthalic acid to give the 17α-haloethynyl-androstane-3β,17β-diol-5,6-oxide, which on reaction with methyl magnesium iodide yields 6β-methyl - 17α - halo ethynyl-androstane-3β,5α,17β-triol. The latter compound is oxidized with an oxidizing reagent prepared from chromium trioxide and sulfuric acid to give 6β-methyl-17α-haloethynyl-androstane-5α,17β-diol-3-one, which on treatment with aqueous sodium hydroxide gives the 6α-methyl-17α-haloethynyl-4-androstene-17β-ol-3-one.

The 6α-methyl-17α-haloethynyl-4-androstene-17β-ol-3-one is dehydrogenated at C–1 by means of selenium dioxide, or alternately by microbiological methods, to give the 6α-methyl-17α-haloethynyl-1,4-androstadiene-17β-ol-3-one.

The 6α-methyl-17α-haloethynyl-4-androstene-17β-ol-3-one is reacted with chloranil to give 6-methyl-17α-haloethynyl-4,6-androstadiene-17β-ol-3-one, which compound is dehydrogenated at C–1, by means of selenium dioxide, or alternately by microbiological methods, to give 6-methyl-17α-haloethynyl-1,4,6-androstatriene-17β-ol-3-one.

The 17β-lower alkyl ethers of the 17β-hydroxy-17α-haloethynyl-3-keto-steroids are prepared by the reaction of the corresponding 17β-hydroxy-steroid with a lower alkyl halide and silver oxide in a solvent such as dimethyl-formamide. The lower alkyl halides which may be used for this purpose includes methyl iodide, ethyl iodide, n-propyl iodide, n-butyl iodide and the like.

The 17β-lower alkanoyl ethers of the 17β-hydroxy-17α-haloethynyl-3-keto-steroids are prepared by the reaction of the corresponding 17β-hydroxy-steroid with a lower alkanoic acid anhydride in the presence of an organic base such as pyridine. The lower acid anhydrides which may be used for this purpose include acetic anhydride, propionic anhydride, butyric anhydride, and the like.

The 17α-haloethynyl-1,4-androstadiene-17β-ol-3-one acetate is prepared by reacting 17α-haloethynyl-4-androstane-17β-ol-3-one with acetic anhydride in pyridine to give the corresponding acetate, and then converting the latter compound into the 17α-haloethynyl-1,4-androstadiene-17β-ol-3-one acetate by means of selenium dioxide, or alternately by microbiological methods.

The 17α-haloethynyl-1,4-androstadiene-17β-methoxy-3-one is prepared by reacting 17α-haloethynyl-4-androstene-17β-ol-3-one with methyl iodide and silver oxide, using dimethyl-formamide as solvent, to give the 17α-haloethynyl-4-androstene-17β-methoxy-3-one and then converting the latter compound into the 17α-haloethynyl-1,4-androstadiene-17β-methoxy-3-one by means of selenium dioxide, or alternately by microbiological methods.

The 6α-chloro-17α-haloethynyl-1,4-androstadiene-17β-ol-3-one acetate is prepared by reacting 17α-haloethynyl-4-androstene-17β-ol-3-one with acetic anhydride and p-toluenesulfonic acid to give the 17α-haloethynyl-3,5-androstadiene-3,17β-diol-diacetate. The latter compound is reacted with N-chlorosuccinimide to give the 6α-chloro-17α-haloethynyl-4-androstene-17β-ol-3-one acetate, which is converted into the 6α-chloro-17α-haloethynyl-1,4-androstadiene-17β-ol-3-one acetate by reaction with selenium dioxide, or alternately by microbiological methods.

The 6α-chloro-17α-haloethynyl-1,4-androstadiene-17β-methoxy-3-one is prepared by reacting 17α-haloethynyl-4-androstene-17β-ol-3-one with methyl iodide and silver oxide, using dimethyl-formamide as solvent, to give the 17α-haloethynyl-4-androstene-17β-methoxy-3-one. The latter compound is then converted into the 17α-haloethynyl-3,5-androstadiene-17β-methoxy-3-ol acetate, by reaction with acetic acid and p-toluenesulfonic acid. The acetate so formed is treated with N-chlorosuccinimide to give the 6α-chloro-17α-haloethynyl-4-androstene-17β-methoxy-3-one, which compound is dehydrogenated by selenium dioxide, or alternately by microbiological methods, to the 6α-chloro-17α-haloethynyl-1,4-androstadiene-17β-methoxy-3-one.

The 6-chloro-17α-haloethynyl-4,6-androstadiene-17β-ol-3-one acetate is prepared by reaction of 17α-haloethynyl-4-androstene-17β-ol-3-one with chloranil to give the 17α-haloethynyl-4,6-androstadiene-17β-ol-3-one (Δ⁶-21-haloethisterone), which is converted into the 17α-haloethynyl-4-androstene-17β-ol-3-one-6,7-oxide on reaction with perbenzoic acid. The latter compound is reacted with HCl in chloroform solution to give the 6-chloro-17α-haloethynyl-4,6-androstadiene-17β-ol-3-one which forms the acetate on treatment with acetic anhydride in pyridine, and the corresponding 17β-methoxy-derivative on reaction with methyl iodide and silver oxide. The 6-chloro-17α-haloethynyl-4,6-androstadiene-17β-ol-3-one acetate is dehydrogenated to the 6-chloro-17α-haloethynyl-1,4,6-androstatriene-17β-ol-3-one acetate on reaction with selenium dioxide, or alternately by microbiological methods.

The 6α-fluoro-17α-haloethynyl-4-androstene-17β-ol-3-one acetate is prepared from the 17α-haloethynyl-3,5-androstadiene-3,17β-diol diacetate by reaction with perchloryl fluoride followed by acid treatment. The 6α-fluoro-17α-haloethynyl-4-androstene-17β-ol-3-one acetate is dehydrogenated at C–1 by means of selenium dioxide, or alternately by microbiological methods, to give 6α-fluoro-17α-haloethynyl1,4-androstadiene-17β-ol-3-one acetate.

The 6α-fluoro-17α-haloethynyl-4-androstene-17β-ol-3-one acetate is reacted with chloranil to give 6-fluoro-17α-haloethynyl-4,6-androstadiene-17β-ol-3-one acetate, and the latter compound is dehydrogenated at C–1 by means of selenium dioxide, or alternately by microbiological methods, to give 6-fluoro-17α-haloethynyl-1,4,6-androstatriene-17β-ol-3-one acetate.

The 17α-haloethynyl-3,5-androstadiene-17β-methoxy-3β-ol acetate is reacted with perchloryl fluoride followed by acid treatment to give 6α-fluoro-17α-haloethynyl-4-androstene-17β-methoxy-3-one, which compound may be dehydrogenated at C–1, by means of selenium dioxide, or alternately by microbiological methods, to give 6α-fluoro-17α-haloethynyl-1,4-androstadiene-17β-methoxy-3-one.

The 6α-fluoro-17α-haloethynyl-4-androstene-17β-methoxy-3-one is converted into 6-fluoro-17α-haloethynyl-4,6-androstadiene-17β-methoxy-3-one by the use of chloranil. The 6-fluoro-17α-haloethynyl-4,6-androstadiene-17β-methoxy-3-one is dehydrogenated at C–1 by means of selenium dioxide, or alternately by microbiological methods, to yield 6-fluoro-17α-haloethynyl-1,4,6-androstatriene-17β-methoxy-3-one.

The 17α-haloethynyl-4-androstene-17β-ol-3-one is reduced to 21-halo-4,20-pregnadiene-17β-ol-3-one by hydrogenation in ethyl acetate, using a Lindlar catalyst, and to 21-halo-4-pregnene-17β-ol-3-one by hydrogenation in ethyl alcohol using a platinum oxide catalyst.

The 6α-methyl-derivatives of the 21-halonorethisterones are prepared by first converting the 21-halonorethisterones 17α-haloethynyl-19-nor-4-androstene-17β-ol-3-one) into the 17α-haloethynyl-19-nor-5-androstene-3β,17β-diol-17β-acetate by reacting the 17α-haloethynyl-19-nor-4-androstene-17β-ol-3-one with acetic anhydride and p-toluenesulfonic acid to give the 17α-haloethynyl-19-nor-3,5-androstadiene-3,17β-diol-diacetate and then reacting the latter compound with sodium borohydride. Oxidation of 17α-haloethynyl-19-nor-5-androstene-3β,17β-diol-17β-acetate with monoperphthalic acid yields 17α-haloethnyl-19-nor-androstane-3β,17β-diol-5,6-oxide-17β-acetate. The latter compound is reacted with methyl magnesium iodide to form 6β-methyl-17α-haloethynyl-19-nor-androstane-3β,5α,17β-triol, which on oxidation with chromic oxide in acetone gives 6β-methyl-17α-haloethynyl-19-nor-androstane-5α,17β-diol-3-one. The latter compound is treated with sodium hydroxide to form 6α-methyl-17α-haloethynyl-19-nor-4-androstene-17β-ol-3-one.

The 6α-methyl-17α-haloethynyl-19-nor-4-androstene-17β-ol-3-one is converted to 6α-methyl-17α-haloethynyl-19-nor-4-androstene-17β-methoxy-3-one by reaction with methyl iodide and silver oxide. The 6α-methyl-17α-haloethynyl-4-androstene-117β-ol-3-one is treated with acetic anhydride in pyridine to give 6α-methyl-17-haloethynyl-19-nor-4-androstene-17β-ol-3-one acetate.

The 6α - chloro - 17α - haloethynyl - 19 - nor - 4-androstene-17β-ol-3-one acetate is prepared from the 17α-haloethynyl - 19 - nor - 3,5 - androstadiene - 3,17β - diol diacetate by reacting with N-chlorosuccinimide.

The 6α - fluoro - 17α - haloethynyl - 19 - nor - 4-androstene-17β-ol-3-one acetate is prepared from the 17α-haloethynyl - 19 - nor - 3,5 - androstadiene - 3,17β - diol diacetate by reacting with perchloryl fluoride followed by acid treatment.

The 6α - chloro - 17α - haloethynyl - 19 - nor - 4-androstene-17β-methoxy-3-one is prepared from the 17α-haloethynyl - 19 - nor - 4 - androstene - 17β - ol - 3 - one by reacting first with silver oxide and methyl iodide to form the 17α-haloethynyl-19-nor-4-androstene-17β-methoxy-3-one. The latter compound is then reacted with acetic anhydride and p-toluenesulfonic acid to give the 17α - haloethynyl - 19 - nor - 3,5 - androstadiene - 17β-methoxy-3-ol acetate, which is converted into the 6α-chloro - 17α - haloethynyl - 19 - nor - 4 - androstene-17β-methoxy-3-one on treatment with N-chlorosuccinimide.

The 6α - fluoro - 17α - haloethynyl - 19 - nor - 4 - androstene-17β-methoxy-3-one is obtained by reacting the 17α - haloethynyl - 19 - nor - 3,5 - androstadiene - 17β-methoxy-3-ol acetate with perchloryl fluoride followed by acid treatment.

The 17α - haloethynyl - 19 - nor - 4 - androstene - 17β-ol-3-one is reduced to 21-halo-19-nor-4,20-pregnadiene-17β-ol-3-one by hydrogenation in ethyl acetate, using a Lindlar catalyst and to 21-halo-19-nor-4-pregnene-17β-ol-3-one by hydrogenation in ethyl alcohol, using a platinum oxide catalyst.

The 17α - haloethynyl - 19 - nor - 5(10) - androstene-17β-ol-3-one forms the acetate on treatment with acetic anhydride in pyridine, and the corresponding 17β-methoxy-derivative on reaction with methyl iodide and silver oxide. The 17α - haloethynyl - 19 - nor - 5(10) - androstene-17β-ol-3-one is reduced to the corresponding chlorovinyl derivative (the 21-halo-19-nor-5(10),20-pregnadiene-17β-ol-3-one) on hydrogenation with a Lindlar catalyst, and to the corresponding chloroethyl derivative (the 21-halo-19-nor-5(10)-pregnene-17β-ol-3-one) on hydrogenation using a heavy metal catalyst such as $PtO_2$.

A further embodiment of our invention comprises novel pharmaceutical compositions containing these 21-haloethisterones and 21-halonorethisterones.

Various changes and modifications may be made in the present invention, certain preferred embodiments of which are herein disclosed, without departing from the scope thereof; to the extent that these changes and modifications are within the scope of the appended claims, they are to be considered a part of this invention.

*Example 1*

Twenty mg. of p-toluenesulfonyl chloride is added to 400 mg. of 17α-ethynyl-5-androstene-3β,17β-diol in 20 ml. of dihydropyran. The resulting mixture is allowed to stand at room temperature overnight. A 2.5 N NaOH solution is added until the mixture is slightly alkaline. Water is then added and the aqueous phase extracted with 4 portions of ether, each containing approximately 50 ml. The combined ether layers are washed with water, dried over $Na_2SO_4$ and evaporated under reduced pressure to give about 725 mg. of a non-crystalline product. The product dissolved in petroleum ether is chromatographed on 60 g. of neutral alumina and the chromatogram eluted with a 7:3 mixture of petroleum ether:ether to give 400 mg. of crystalline product, the 17α-ethynyl-5-androstene-3β,17β-diol-bis-tetrahydropyranyl ether, I.R. $\lambda_{max}^{Nujol}$ 2.90μ

A solution of about 4 grams of 17α-ethynyl-5-androstene-3β,17β-diol bis-tetrahydropyranyl ether in 75 ml. of t-butyl alcohol is prepared. About 1.1 equivalents of a 1.0 molar potassium t-butoxide is added and the resulting mixture refluxed for one hour, with stirring, and then cooled. About 1.84 ml. of t-butyl hypochlorite is then added in one portion and the reaction mixture is left stirring at room temperature overnight. About 100 ml. of water is added and the resulting aqueous mixture is extracted with four portions of ether, each containing approximately 200 ml. The combined layers are washed with water, dried over sodium sulfate, filtered and evaporated to dryness in vacuo. The residual material is dissolved in petroleum ether and chromatographed on 120 g. of alumina. Elution with petroleum ether gives about 3.10 grams (a 70% yield) of crystals of 17α-chloroethynyl - 5 - androstene - 3β,17β - diol - bis - tetrahydropyranyl ether. The crude product shows infrared peaks at 4.4μ and 2.9μ.

A solution of about 3 g. of the 17α-chloroethynyl-5-androstene - 3β,17β - diol - bis - tetrahydropyranyl ether in 125 ml. of methanol is prepared. To this solution is added 2.5 ml. of concentrated hydrochloric acid and the reaction mixture is stirred for about 1 hour at room temperature. The methanol is then removed by evaporation under reduced pressure until the product crystallizes. Approximately 100 ml. of water is then added and the resulting product is extracted with four portions of ether, each containing about 200 ml. The combined ether extract is washed with water, dried over sodium sulfate and evaporated to a crystalline residue. The residual crystalline material is recrystallized several times from ether to give about 1.58 g. of 17α-chloroethynyl-5-androstene-3β,17β-diol which has the following properties: M.P. 195° C. Analysis: (Calculated for $C_{21}H_{29}O_2Cl$): C, 72.30; H, 8.38; Cl, 10.16. Found: C, 71.64; H, 8.63; Cl, 10.48.

One hundred mg. of 17α-chloroethynyl-5-androstene-3β,17β-diol is dissolved in 1.0 ml. of cyclohexanone and 10 ml. of benzene in a flask fitted with a magnetic stirrer and a reflux condenser. About 5 ml. of the benzene is distilled and a stream of dry nitrogen is passed through the system and maintained throughout the reaction time. Then 0.5 ml. of a 10% solution of aluminum isopropoxide in benzene is added and the reaction mixture is maintained at reflux temperature for 4 hours. The solution is cooled, 5 drops of water are added and the resultant aluminum hydroxide is filtered off. The filtrate is taken to dryness under reduced pressure. The material is dissolved in ether, filtered, and the filtrate concentrated to give about 37 mg. of crude 17α-chloroethynyl-4-androstene-17β-ol-3-one, M.P. 178–183° C. Recrystallization from ether gives about 25 mg. of the purified product, M.P. 182–184° C. Chromatography of all mother liquors on 3 g. of alumina and elution of the chromatogram with ether gives an additional 20 mg. of product, M.P. 181–184° C. Total yield 45 mg. The product has the following properties:

U.V. $\lambda_{max}^{MeOH}$ 241 mμ, ε 15,000, I.R. $\lambda_{max}^{Nujol}$ 2.8, 4.43, 6.0, 6.18μ

Analysis: (Calculated for $C_{21}H_{27}O_2Cl$): C, 72.73; H, 7.85; Cl, 10.22. Found: C, 73.41; H, 7.93; Cl, 10.81.

*Example 2*

To a solution of 482 mg. of 17α-ethynyl-5-androstene-3β,17β-diol-bis-tetrahydropyranyl ether in 10 ml. of tertiary-butyl alcohol, is added about 1.1 equivalents of a 1.0 molar potassium t-butoxide. The resulting mixture is refluxed for one hour, with stirring, and then cooled. 196 mg. of N-bromosuccinimide is then added and the reaction mixture is stirred at room temperature for about 18 hours. The entire reaction mixture is dissolved in water and then extracted with 3 portions of ether, each containing approximately 50 ml. The combined ether extracts are washed with three portions of a saturated solution of $NaHCO_3$, each portion containing approximately 25 ml., then with 3 portions of water, each containing about 25 ml. The ether layer is dried over sodium sulfate, filtered and evaporated to dryness. The oily residue is filtered through 20 g. of aluminum oxide to give 407 mg. of oily material which is dissolved in petroleum ether and chromatographed on 30 g. of acetone activated alkaline alumina. Elution with a 9:1 mixture of petroleum ether and ether yields 87 mg. of 17α-bromo - ethynyl - 5 - androstene - 3β,17β - diol - bis-tetrahydropyranyl ether. An infrared spectrum of this material shows $\lambda_{max}$ 4.5μ.

To a solution of 17α-bromoethynyl-5-androstene-3β,17β-diol-bis-tetrahydropyranyl ether in 40 ml. of methanol is added 0.8 ml. of concentrated HCl, and the reaction mixture is stirred for one hour at room temperature. The methanol is then removed under reduced pressure. Water is added and the resulting solution is extracted with 3 portions of ether, each portion containing approximately 75 ml. The combined ether extracts are washed three times with approximately 50 ml. of water, dried over sodium sulfate, filtered and evaporated to dryness. The residual material is crystallized to give 230 mg. of 17α-bromoethynyl-5-androstene-3β,17β-diol which has the following properties: M.P. 214–215° C.

I.R. $\lambda_{max.}^{Nujol}$ 2.7, 2.89, 4.55μ

Analysis: (Calculated for $C_{21}H_{29}O_2Br$): C, 64.10; H, 7.43; Br, 20.32. Found: C, 62.40; H, 7.65; Br, 20.50.

17α-bromoethynyl-5-androstene-3β,17β-diol (195 mg.) is dissolved in 1.95 ml. of cyclohexanone and 20 ml. of benzene, using a flask fitted with a magnetic stirrer and a reflux condenser. After 3 ml. of benzene is distilled, a stream of dry nitrogen is passed through the system, and maintained throughout the entire reaction time. After cooling to room temperature, there is added 0.98 ml. of a 10% solution of aluminum isopropoxide in benzene, and the reaction mixture is refluxed for 3 hours and cooled to room temperature. Ten drops of water are added and the reaction mixture is filtered. The filtrate is taken to dryness. The residue is chromatographed on 15 g. of acetone activated acid-washed alumina and 85 mg. of product is eluted with a mixture of seven parts ether to three parts petroleum ether. The 17α-bromoethynyl-4-androstene-17β-ol-3-one so obtained has the following properties:

U.V. $\lambda_{max.}^{MeOH}$ 240 mμ, ε 15,700, I.R. $\lambda_{max.}^{Nujol}$ 2.9, 4.51, 6.0, 6.2μ

Analysis: (Calculated for $C_{21}H_{27}O_2Br$): C, 64.56; H, 6.95; Br, 20.42. Found: C, 65.16; H, 7.30; Br, 21.44.

*Example 3*

To a solution of one gram of 17α-ethynyl-19-nor-4-androstene-17β-ol-3-one dissolved in 75 ml. of benzene is added 7.5 ml. of ethylene glycol, together with 50 mg. of p-toluenesulfonic acid. The reaction mixture is heated at reflux with a water separator for 20 hours. The reaction mixture is cooled, and about 10 ml. of bicarbonate solution is added. The reaction mixture is extracted with 3 portions of ether, each portion containing about 100 ml. The combined extracts are washed with water, dried over sodium sulfate and evaporated to dryness to give a mixture of the $\Delta^5$ and $\Delta^{5(10)}$-17α-ethynyl-3-ethylenedioxy-19-nor-androstene-17β-ols.

To a solution of the total crude material from the above reaction in 10 ml. of dihydropyran which has been distilled from sodium metal, is added with stirring, 120 mg. of p-toluenesulfonyl chloride, and the stirring is continued at room temperature for 64 hours. Saturated sodium bicarbonate solution (10 ml.) is then added to the reaction mixture. The mixture is then extracted with 3 portions of ether, each portion containing about 50 ml. The extracts are combined, washed with water and dried over sodium sulfate, and evaporated to dryness in vacuo. The crude oil (about 3.5 g.) is dissolved in petroleum ether and chromatographed on 100 g. of acetone activated alkaline alumina. The chromatogram is eluted with mixtures of ether and petroleum ether to give 1.043 g. of a mixture of the $\Delta^5$ and $\Delta^{5(10)}$-17α-ethynyl-3-ethylenedioxy - 19 - nor - androstene - 17α - ol - tetrahydropyranyl ethers. The infrared spectrum shows bands at 2.9μ and 9.0μ.

To a stirred solution of 2.130 g. of the mixture of the $\Delta^5$ and $\Delta^{5(10)}$-17α-ethylnyl-3-ethylenedioxy-19-nor-androstene-17β-ol-tetrahydropyranyl ethers, dissolved in 50 ml. of dry t-butanol is added 5.5 ml. of 1 M potassium-t-butoxide. The reaction mixture is heated at reflux for ninety minutes and then cooled to room temperature. Then 0.95 ml. of t-butyl hypochlorite is added. The reaction mixture is left to stir at room temperature for about 16 hours. About 100 ml. of water is added to the reaction mixture and the aqueous solution is extracted with three portions of ether, each portion containing about 200 ml. The extracts are combined, washed with water, dried over sodium sulfate, filtered and evaporated to dryness under reduced pressure. About 2.2 g. of crude product is obtained. This is chromatographed on 100 g. of alkaline alumina. The material dissolved in petroleum ether to which a small amount of benzene has been added is chromatographed on alumina and eluted with ether-petroleum ether mixtures. 1.9 g. of a semi-crystalline product, a 17α - chloroethynyl - 3 - ethylenedioxy-19-nor-5[and 5(10)]-androstene-17β-ol-tetrahydropyranyl ether, is obtained. Infrared absorption shows bands at 4.45μ and strong absorption in the 9–10μ region.

To a stirred solution of 1.9 grams of 17α-chloroethylnyl-3-ethylenedioxy-19-nor-5[and 5(10)]-androstene-17β-ol-tetrahydropyranyl dissolved in 41 ml. of methanol is added 3 ml. of concentrated hydrochloric acid and 2.1 ml. of water. The reaction mixture is stirred at room temperature for 2½ hours. The methanol is then removed under reduced pressure. The residue is dissolved in about 200 ml. of ether and washed with water until the washings are neutral. The ether solution is dried over sodium sulfate and evaporated to dryness. The crystalline residue, recrystallized from a mixture of ether and methylene chloride, gives 1.2 g. of 17α-chloroethynyl-19-nor-4-androstene-17β-ol-3-one, M.P. 194–200° C. A sample recrystallized for analysis from ethyl acetate has a melting point of 198–201° C. and shows the following properties:

U.V.: $\lambda_{max.}^{MeOH}$ 240 mμ., ε 15,000, I.R.: $\lambda_{max.}^{Nujol}$ 2.9μ., 4.48, 6.05, 6.2μ

Analysis: (Calculated for $C_{20}H_{25}O_2Cl$): C, 72.20; H, 7.57; Cl, 10.65. Found: C, 72.27; H, 7.57; Cl, 9.90.

Ten mg. of the mixture of 17α-chloroethynyl-3-ethylenedioxy - $\Delta^5$-[and $\Delta^{5(10)}$] - androstene-17β-ol-tetrahydropyranyl ether is treated with 1 cc. of 70% aqueous acetic acid for 1 hour at room temperature. The product is neutralized with aqueous sodium hydroxide and extracted with ether. The ether extract is dried and concentrated in vacuo. The crude product is chromatographed on acid-washed alumina and eluted with mixtures of ether and petroleum ether to give the 17α-ethynyl-5(10)-androstene-17β-ol-3-one.

*Example 4*

3.2 ml. of potassium t-butoxide is added to 849 mg. of 17α - ethynyl-3-ethylenedioxy-19-nor-5[and 5(10)]-androstene-17β-ol-tetrahydropryanyl ether, prepared as in Example 3, in 28 ml. of t-butyl-alcohol. This mixture is refluxed for 75 minutes and then cooled to room temperature. 1.136 g. of N-bromosuccinimide is added and the reaction mixture is then stirred at room temperature for about 17 hours. The reaction mixture is added to about 60 ml. of water and extracted with 3 portions of ether, each portion containing about 75 ml. The ether extracts are combined, washed with 3, 50 ml. portions of saturated sodium bisulfite solution, and then with water until the washings are neutral. The ether solution is dried over sodium sulfate, filtered and evaporated to dryness to yield the crude 17α-bromoethynyl-3-ethylenedioxy-19-nor-5[and 5(10)]-androstene-17β-ol-tetrahydropyranyl ether which may be used in the next step without purification.

The crude steroid is dissolved in 25 ml. of methanol and 0.2 ml. of concentrated hydrochloric acid. The mixture is stirred at room temperature for 2½ hours. The methanol is then removed under reduced pressure, water is added, and the reaction mixture is extracted with 3, 75 ml. portions of ether. The ether layer is washed with water, dried over sodium sulfate, filtered and evaporated to dryness. This gives 737 mg. of crude oil which is chromatographed on 44 g. of acetone activated acid-washed alumina. Elution with a mixture of ether and petroleum ether gives a crystalline material which is recrystallized from ether to yield about 75 mg., M.P. 180–182° of 17α-bromoethynyl-19-nor-4-androstene-17β-ol-3-one which has the following properties:

U.V.: $\lambda_{max.}^{MeOH}$ 239 m$\mu$, E mol, 16,300, I.R.: $\lambda_{max.}^{Nujol}$ 2.85, 4.55, 6.1 and 6.2$\mu$.

Analysis: (Calculated for $C_{20}H_{25}O_2Br$): C, 63.67; H, 6.68. Found: C, 64.11; H, 7.05.

Ten mg. of the mixture of 17α-bromoethynyl-3-ethylenedioxy - $\Delta^5$ - [and $\Delta^{5(10)}$]-androstene-17β-ol-tetrahydropyranyl ether is treated wtih 1 cc. of 70% aqueous acetic acid for 1 hour at room temperature. The product is neutralized with aqueous sodium hydroxide and extracted with ether. The ether extract is dried and concentrated in vacuo. The crude product is chromatographed on acid-washed alumina and eluted with mixtures of ether and petroleum ether to give the 17α-ethynyl-5(10)-androstene-17β-ol-3-one.

Example 5

Ten grams of 17α-chloroethynyl-5-androstene-3β,17β-diol in 150 ml. of tetrahydrofuran is treated with 100 ml. of 0.9 m. monoperphthalic acid in ethyl acetate and allowed to stand overnight at room temperature. The reaction mixture is diluted with ethyl acetate and washed sequentially with aqueous sodium bicarbonate, sodium bisulfite, and sodium bicarbonate solution. The organic layer is dried and concentrated in vacuo. The product is fractionally crystallized from aqueous ethanol to yield the 17α-chloroethynyl-androstane-3β,17β-diol-5, 6α-oxide.

Five grams of 17α-chloroethynyl-androstane-3β,17β-diol-5,6α-oxide in benzene is added to a reagent prepared from 3.4 g. of magnesium, 10 ml. of methyl iodide and 45 ml. of ether. The mixture is stirred and 70 ml. of solvent is removed by distillation. After refluxing for 5 hours, the mixture is cooled, acidified with dilute hydrochloric acid and the organic layer washed to neutrality. The organic phase is dried and concentrated in vacuo. Crystallization from aqueous ethanol gives the 6β-methyl-17α-chloroethynyl - androstane-3β,5α,17β-triol.

The oxidizing reagent is prepared by diluting 2.7 g. of $CrO_3$ and 2.3 ml. of concentrated sulfuric acid to 10 ml. with water. A solution of 1.90 g. of 6β-methyl-17α-chloroethynyl-androstane-3β,5α,17β-triol in 300 ml. of acetone is cooled to 0° and treated with 1.85 ml. of the oxidizing reagent. The solution is diluted with ice water and extracted with ether. The ether extract is washed sequentially with water, and aqueous sodium bicarbonate and then dried and concentrated in vacuo, to give 6β-methyl-17α-chloroethynyl - androstane-5α,17β-diol-3-one. The crude product is dissolved in 150 ml. of methanol, 75 ml. of 1 N sodium hydroxide is added and the mixture is stirred at room temperature under nitrogen for 24 hours. The mixture is concentrated to half volume under vacuo at 25° C. and then poured into ice water. The product is extracted with ether. The ether layer is washed with water, dried and concentrated. The concentrate is chromatographed on acid-washed alumina and the product eluted with ether-petroleum ether mixtures to yield 6α - methyl-17α-chloroethynyl-4-androstene-17β-ol-3-one.

In accordance with the above procedures, but starting with the 17α-bromoethynyl-5-androstene-3β,17β-diol in place of the 6α-methyl-17α-chloroethynyl-4-androstene-17β-ol-3-one, there is obtained the 6α-methyl-17α-bromoethynyl-4-androstene-17β-ol-3-one.

Example 6

To 100 mg. of 6α-methyl-17α-chloroethynyl-4-androstene-17β-ol-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 6α-methyl-17α-chloroethynyl-1,4-androstadiene-17β-ol-3-one.

In accordance with the above procedures, but starting with the 6α-methyl-17α-bromoethynyl-4-androstene-17β-ol-3-one in place of the 6α-methyl-17α-chloroethynyl-4-androstene-17β-ol-3-one, there is obtained the 6α-methyl-17α-bromoethynyl-1,4-androstadiene-17β-ol-3-one.

*Septomyxa affinis* (ATCC 6,737) is inoculated from a slant into 250 ml. shake flasks containing 50 ml. of the following medium: 2% Edamin (Sheffield Farms), 5% glucose, and 0.5% corn steep liquor. After a 48 hour incubation at 28° C., 10 mg. of 6α-methyl-17α-chloroethynyl-4-androstene-17β-ol-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 6α-methyl-17α-chloroethynyl - 1,4 - androstadiene-17β-ol-3-one is readily crystallized from the concentrate. Descending paper chromatography of the product in a system using formamide as the stationary phase and chloroform as the mobile phase, shows some of the steroid substrate, but is largely the somewhat more polar $\Delta'$-dehydrogenation product.

*Bacillus sphaericus* (ATCC 12,488) is inoculated from a slant into 250 ml. shake flasks containing 50 ml. of the following medium: 2% Edamin (Sheffield Farms), 5% glucose, and 0.5% corn steep liquor. After a 24 hour incubation at 28° C., 10 mg. of 6α-methyl-17α-chloroethynyl-4-androstene-17β-ol-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 6α-methyl-17α-chloroethynyl - 1,4 - androstadiene-17β-ol-3-one, is readily crystallized from the concentrate. Descending paper chromatograpy of the product in a system using formamide as the stationary phase and chloroform as the mobile phase, shows some of the steroid substrate, but is largely the somewhat more polar $\Delta'$-dehydrogenation product.

In accordance with the above procedures, but using the 6α-methyl-17α-bromoethynyl-4-androstene-17β-ol-3-one in place of the 6α-methyl-17α-chloroethynyl-4-androstene-17β-ol-3-one, there is obtained the 6α-methyl-17α-bromoethynyl-1,3-androstadiene-17β-ol-3-one.

Example 7

A suspension of 1 g. of 6α-methyl-17-chloroethynyl-4-androstene-17β-ol-3-one and 2.4 g. of chloranil in 30 ml. of ethyl acetate and 6 ml. of acetic acid is stirred and refluxed for 16 hours. The reaction mixture is cooled and filtered. The product is washed sequentially with aqueous bisulfite, aqueous potassium hydroxide and water. The organic layer is dried and concentrated in vacuo. Chromatography yields 6-methyl-17α-chloroethynyl-4,6-androstadiene-17β-ol-3-one.

Example 8

To 100 mg. of 6-methyl-17α-chloroethynyl-4,6-androstadiene-17β-ol-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed for an additional 24 hours. The product is filtered and the filtrate evaporated to dryness. The residue is extracted with ethyl aceate and the extract is washed successively with aqueous sodium bicarbonate, ammonium sulfide, dilute ammonia water, water, dilute hydrochloric acid and water, and is then dried over magnesium sulfate. The extract is treated with activated charcoal and then concentrated to dryness. Crystalliztaion of the residue from a mixture of acetone and ether gives 6-methyl-17α-chloroethynyl-1,4,6-androstatriene-17β-ol-3-one.

In accordance with the above procedures, but starting with the 6-methyl-17α-bromoethynyl - 4,6 - androstadiene-17β-ol-3-one in place of the 6-methyl-17α-chloroethynyl-4,6-androstadiene-17β-ol-3 - one there is obtained the 6-methyl-17α-bromoethynyl-1,4,6-androstatriene-17β-ol - 3-one.

*Septomyxa affinis* (ATCC 6,737) is inoculated from a slant into 250 ml. shake flasks containing 50 ml. of the following medium: 2% Edamin (Sheffield Farms), 5% glucose, and 0.5% corn steep liquor. After a 48 hour incubation at 28° C., 10 mg. of 6-methyl - 17α - chloroethynyl-4,6-androstadiene-17β-ol-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 6-methyl-17α-chloroethynyl-1,4,6 - androstatriene-17β-ol-3-one, is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

*Bacillus sphaericus* (ATCC 12,488) is inoculated from a slant into 250 ml. shake flasks containing 50 ml. of the following medium: 2% Edamin (Sheffield Farms), 5% glucose, and 0.5 corn steep liquor. After a 24 hour incubation at 28° C., 10 mg. of 6α-methyl-17α-chloroethynyl-4,6-androstadiene-17β-ol-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 6α-methyl-17α-chloroethynyl-1,4,6-androstatriene-17β-ol-3-one, is readily crystallized from the concentrate. Descending paper chromatography of the product in a system using formamide as the stationary phase, and chloroform as the mobile phase, shows some of the steroid substrate, but is largely the somewhat more polar Δ'-dehydrogenation product.

In accordance with the above procedures, but starting with the 6α-methyl-17α-bromoethynyl-4,6-androstadiene-17β-ol-3-one in place of the 6α-methyl-17α-chloroethynyl-4,6-androstadiene-17β-ol-3-one, there is obtained the 6α-methyl-17α-bromoethynyl-1,4,6 - androstatriene - 17β - ol-3-one.

Example 9

A mixture of 500 mg. of the 6α-methyl-17α-chloroethynyl-4-androstene-17β-ol-3-one, 10 ml. of dimethyl formamide, 20 ml. of methyl iodide, and 1.5 gms. of silver oxide is stirred at room temperature for 4 days. An additional ½ gm. of silver oxide is added at the end of each day. One hundred ml. of chloroform is then added to the reaction mixture, then stirred for one hour, filtered, and the filtrate evaporated to dryness. The residual oil is chromatographed with acid-washed alumina and eluted with mixtures of ether and petroleum ether to give 6α-methyl-17α-chloroethynyl-4 - androstene - 17β - methoxy-3-one.

In accordance with the above procedures, but starting with the 6α-methyl-17α-bromoethynyl-4-androstene-17β-ol-3-one in place of the 6α-methyl-17α-chloroethynyl-4-androstene-17β-ol-3-one there is obtained the 6α-methyl-17α-bromoethynyl-4-androstene-17β-methoxy-3-one.

100 mg. of 6α-methyl-17α-chloroethynyl-4-androstene-17β-ol-3-one is heated with 1 cc. of acetic anhydride and 1.2 cc. of pyridine on the steam bath over night. The reaction mixture is then poured onto ice and extracted with chloroform. The extract is washed with water and concentrated. The concentrate is chromatographed over acid-washed alumina and eluted with mixtures of ether and petroleum ether to give 6α-methyl-17α-chloroethynyl-4-androstene-17β-ol-3-one acetate.

In accordance with the above procedures, but starting with the 6α-methyl-17α-bromoethynyl-4-androstene-17β-ol-3-one in place of the 6α-methyl-17α-chloroethynyl-4-androstene-17β-ol-3-one there is obtained the 6α-methyl-17α-bromoethynyl-4-androstene-17β-ol-3-one acetate.

Example 10

100 mg. of 17α-chloroethynyl-4-androstene-17β - ol - 3-one (Example 1) is heated with 1 cc. of acetic anhydride and 1.2 cc. of pyridine on the steam bath overnight. The reaction mixture is then poured onto ice and extracted with chloroform. The extract is washed with water and concentrate is chromatographed over acid-washed alumina and eluted with mixtures of ether-petroleum and ether to give 17α-chloroethynyl-4-androstene-17β-ol-3-one acetate.

In accordance with the above procedure, but starting with the 17α-bromoethynyl-4-androstene-17β-ol-3-one in place of the 17α-chloroethynyl-4-androstene-17β-ol-3-one there is obtained the 17α-bromoethynyl-4-androstene-17β-ol-3-one acetate.

Example 11

To 100 mg. of 17α-chloroethynyl-4-androstene-17β-ol-3-one acetate in 5 ml. of t-butanol and 0.1 ml. of actetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, water, dilute hydrochloric acid and water, and then dried over magnesium sulfate. The extract is treated with activated charcoal and then concentrated to dryness. Crystallization of the residue gives 17α-chloroethynyl-1,4-androstadiene-17β-ol-3-one acetate.

In accordance with the above procedures, but starting with the 17α-bromoethynyl-4-androstene-17β-ol-3-one acetate in place of the 17α-chloroethynyl-4-androstene-17β-ol-3-one acetate, there is obtained the 17α-bromoethynyl-1,4-androstadiene-17β-ol-3-one acetate

*Corynebacterium simplex* (ATCC 6,946) is inoculated from a slant to 250 ml. shake flasks containing a medium having the composition: 1 g./liter yeast extract (Difco). After an 18 hour growth phase at 28° C., 10 mg. of 17α-chloroethynyl-4-androstene-17β-ol-3-one acetate is added to each flask as a dimethylformamide solution (100 mg./ml.). After a 24 hour transformation period at 28° C., the cells are centrifuged, followed by three ethyl acetate extracts of the cell-free broth. The extracts are combined and concentrated in vacuo. The 17α-chloroethynyl-1,4-androstadiene 17β-ol-3-one acetate is crystallized directly from the concentrate. Paper chromatography of the product in a system utilizing formamide as the stationary phase and chloroform-benzene (1:1) as the mobile phase indicates that the product possesses a polarity slightly greater than the substrate.

*Septomyxa affinis* (ATCC 6,737) is inoculated from a slant into 250 ml. shake flasks containing 50 ml. of the following medium: 2% Edamin (Sheffield Farms), 5% glucose, 0.5% corn steep liquor. After a 48 hour incubation at 28° C., 10 mg. of 17α-chloroethynyl-4-androstene-17β-ol-3-one acetate is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The product is re-acetylated by treatment with acetic anhydride and pyridine, and then purified by recrystallization to give the 17α-chloroethynyl-1,4-androstadiene-17β-ol-3-one acetate. Descending paper chromatography of the product in a system using formamide as the stationary phase, and chloroform as the mobile phase, shows some of the steroid substrate, but is largely the somewhat polar Δ'-dehydrogenation product.

In accordance with the above procedures, but using the 17α-bromoethynyl-4-androstene-17β-ol-3-one acetate in place of the 17α-chloroethynyl-4-androstene-17β-ol-3-one acetate, there is obtained the 17α-bromoethynyl-1,4-androstadiene-17β-ol-3-one acetate.

*Example 12*

A mixture of 500 mg. of the 17α-chloroethynyl-4-androstene-17β-ol-3-one, 10 ml. of dimethylformamide, 20 ml. of methyl iodide, and 1.5 gms. of silver oxide is stirred at room temperature for 4 days. An additional ½ gm. of silver oxide is added at the end of each day. One hundred ml. of chloroform is then added to the reaction mixture, which is then stirred for one hour, filtered, and the filtrate is evaporated to dryness. The residual oil is chromatographed with acid-washed alumina and eluted with mixtures of ether and petroleum ether to give 17α-chloroethynyl-4-androstene-17β-methoxy-3-one.

In accordance with the above procedures, but starting with the 17α-bromoethynyl-4-androstene-17β-ol-3-one in place of the 17α-chloroethynyl-4-androstene-17β-ol-3-one, there is obtained the 17α-bromoethynyl-4-androstene-17β-methoxy-4-one.

*Example 13*

To 100 m. of 17α-chloroethynyl-4-androstene-17β-methoxy-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, water, dilute hydrochloric acid and water, and then dried over magnesium sulfate. The extract is treated with activated charcoal and then concentrated to dryness. Crystallization of the residue from a mixture of acetone and ether gives 17α-chloroethynyl-1,4-androstadiene-17β-methoxy-3-one.

*Septomyxa affinis* (ATCC 6,737) is inoculated from a slant into 250 ml. shake flasks containing 50 ml. of the following medium: 2% Edamin (Sheffield Farms), 5% glucose, and 0.5% corn steep liquor. After a 48 hour incubation at 28° C., 10 mg. of 17α-chloroethynyl-4-androstene-17β-methoxy-3-one is added to each shake flasks as a dimethylformamide solution (100 mg./ml.). After a conversion period of 24 hours, the cells are removed by filtration, followed by three successive extractions with equal volume of ethyl acetate. The extracts are combined and concentrated in vacuo.

The 17α-chloroethynyl-1,4-androstadiene-17β-methoxy-3-one is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

*Bacillus sphaericus* (ATCC 12,488) is inoculated from a slant into 250 ml. shake flasks containing 50 ml. of the following medium: 2% Edamin (Sheffield Farms), 5% glucose, and 0.5% corn steep liquor. After a 24 hour incubation at 28° C., 10 mg. of 17α-chloroethynyl-4-androstene-17β-methoxy-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 17α-chloroethynyl-1,4-androstadiene-17β-methoxy-3-one, is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

In accordance with the above procedures, but using the 17α-bromoethynyl-4-androstene-17β-methoxy-3-one in place of the 17α-chloroethynyl-4-androstene-17β-methoxy-3-one, there is obtained the 17α-bromoethynyl-1,4-androstadiene-17β-methoxy-3-one.

*Example 14*

A mixture of 1 g. of 17α-chloroethynyl-4-androstene-17β-ol-3-one, 10 ml. of acetic anhydride and 100 mg. of p-toluenesulfonic acid is heated on the steam bath for one hour and allowed to stand overnight at room temperature. It is then poured into ice water and left to stand at room temperature for one half hour. The reaction mixture is then extracted with ether. The ether extract is washed with water and aqueous sodium bicarbonate, dried, and concentrated to yield the crude 17α-chloroethynyl-3,5-androstadiene-3,17β-diol diacetate. The product, crystallized from petroleum ether, has a melting point of 125–131° C. The analysis of a sample which has a melting point of 130–136° C. is: C, 69.75; H, 7.23. Calculated: C, 69.67; H, 7.25.

To a solution of 200 mg. of the 17α-chloroethynyl-3,5-androstadiene-3,17β-diol-diacetate dissolved in 2 ml. of acetic acid is added with stirring, 56 ml. of N-chlorosuccinimide and 2 ml. of tetrahydrofuran containing 5% of dry HCl. The reaction is stirred at room temperature for 2½ hours. Sodium bicarbonate is added and the reaction mixture is extracted with ether. The ether extracts are dried and concentrated. The material is chromatographed over acid-washed alumina, and eluted with ether-petroleum ether mixtures, to give the 6α-chloro-17α-chloroethynyl-4-androstene-17β-ol-3-one acetate. The analytical sample is crystallized from a mixture of methylene chloride-ether and has the following properties:

M.P. 220–230° C., $\lambda_{MeOH}^{maximum}$ 235 m$\mu$, $\epsilon$ 13,600

Analysis calculated: C, 65.26; H, 6.67; Cl, 16.75. Found: C, 65.80; H, 6.74; Cl, 17.86.

In accordance with the above procedures, but starting with the 17α-bromoethynyl-4-androstene-17β-ol-3-one in place of the 17α-chloroethynyl-4-androstene-17β-ol-3-one, there is obtained as intermediate, the 17α-bromoethynyl-3,5-androstadiene-3,17β-diol-diacetate, and as product, the 6α-chloro-17α-bromoethynyl-4-androstene-17β-ol-3-one acetate.

*Example 15*

To 100 mg. of 6α-chloro-17α-chloroethynyl-4-androstene-17β-ol-3-one acetate in 5 ml. of t-butanol and 0.1 ml. of acetic acid is added 50 mg. of selenium dioxide. The mixture is refluxed under nitrogen for 18 hours;

then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 6α-chloro-17α-chloroethynyl-1,4-androstadiene-17β-ol-3-one acetate.

In accordance with the above procedures, but starting with the 6α-chloro-17α-bromoethynyl-4-androstene-17β-ol-3-one acetate in place of the 6α-chloro-17α-chloroethynyl-4-androstene-17β-ol-3-one acetate there is obtained the 6α-chloro-17α-bromoethynyl-1,4-androstadiene-17β-ol-3-one acetate.

*Corynebacterium simplex* (ATCC 6,946) is inoculated from a slant to 250 ml. shake flasks containing a medium having the composition: 1 g./liter yeast extract (Difco). After an 18 hour growth phase at 28° C., 10 mg. of 6α-chloro-17α-chloroethynyl-4-androstene-17β-ol-3-one acetate is added to each flask as a dimethylformamide solution (100 mg./ml.). After a 24 hour transformation period at 28° C., the cells are centrifuged, followed by three ethyl acetate extracts of the cell-free broth. The extracts are combined and concentrated in vacuo. The 6α-chloro-17α-chloroethynyl-1,4-androstadiene-17β-ol-3-one acetate is crystallized directly from the concentrate. Paper chromatography of the product is a system utilizing formamide as the stationary phase and chloroform-benzene (1:1) as the mobile phase indicates that the product possesses a polarity slightly greater than the substrate.

*Septomyxa affinis* (ATCC 6,737) is inoculated from a slant into 250 ml. shake flasks containing 50 ml. of the following medium: 2% Edamin (Sheffield Farms), 5% glucose, and 0.5% corn steep liquor. After a 48 hour incubation at 28° C., 10 mg. of 6α-chloro-17α-chloroethynyl-4-androstene-17β-ol-3-one acetate is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The product is re-acetylated by treatment with acetic anhydride and pyridine, and then purified by recrystallization to give the 6α-chloro-17α-chloroethynyl-1,4-androstadiene-17β-ol-3-one acetate, is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

In accordance with the above procedures, but using the 6α-chloro-17α-bromoethynyl-4-androstene-17β-ol-3-one acetate in place of the 6α-chloro-17α-chloroethynyl-4-androstene-17β-ol-3-one acetate, there is obtained the 6α-chloro-17α-bromoethynyl-1,4-androstadiene-17β-ol-3-one acetate.

Example 16

A mixture of 1 g. of 17α-chloroethynyl-4-androstene-17β-methoxy-3-one (Example 10), 10 ml. of acetic anhydride and 100 mg. of p-toluenesulfonic acid is heated on the steam bath for one hour and allowed to stand overnight at room temperature. It is then poured into ice water and left to stand at room temperature for one half hour. The reaction mixture is then extracted with ether. The ether extract is washed with water and aqueous sodium bicarbonate, dried, and concentrated to yield the 17α-chloroethynyl-3,5-androstadiene-17β-methoxy-3-ol acetate.

To a solution of 200 mg. of the 17α-chloroethynyl-3,5-androstadiene-17β-methoxy-3-ol-acetate dissolved in 2 ml. of acetic acid is added, with stirring, 56 ml. of N-chlorosuccinimide and 2 ml. of tetrahydrofuran containing 5% of dry HCl. The reaction is stirred at room temperature for 2½ hours. Sodium bicarbonate is added. The reaction mixture is then extracted with ether. The ether extracts are dried and concentrated. The material is chromatographed over acid-washed alumina, and eluted with ether-petroleum ether mixtures to give 6α-chloro-17α-chloroethynyl-4-androstene-17β-methoxy-3-one.

In accordance with the above procedures, but starting with the 17α-bromoethynyl-4-androstene-17β-methoxy-3-one in place of the 17α-chloroethynyl-4-androstene-17β-methoxy-3-one, there is obtained as intermediates, the 17α-chloroethynyl-3,5-androstadiene-17β-methoxy-3-ol-acetate, and as product, the 6α-chloro-17α-chloroethynyl-4-androstene-17β-methoxy-3-one.

Example 17

To 100 mg. of 17α-chloroethynyl-4-androstene-17β-methoxy-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 17α-chloroethynyl-1,4-androstadiene-17β-methoxy-3-one.

*Septomyxa affinis* (ATCC 6,737) is inoculated from a slant into 250 ml. shake flasks containing 50 ml. of the following medium: 2% Edamin (Sheffield Farms), 5% glucose, and 0.5% corn steep liquor. After a 48 hour incubation at 28° C., 10 mg. of 17α-chloroethynyl-4-androstene-17β-methoxy-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 17α-chloroethynyl-1,4-androstadiene-17β-methoxy-3-one is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

*Bacillus sphaericus* (ATCC 12,488) is inoculated from a slant into 250 ml. shake flasks containing 50 ml. of the following medium: 2% Edamin (Sheffield Farms), 5% glucose, and 0.5% corn steep liquor. After a 24 hour incubation at 28° C., 10 mg. of 17α-chloroethynyl-4-androstene-17β-methoxy-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 17α-chloroethynyl-1,4-androstadiene-17β-methoxy-3-one is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

In accordance with the above procedures, but using the 17α-bromoethynyl-4-androstene-17β-methoxy-3-one in place of the 17α-chloroethynyl-4-androstene-17β-methoxy-3-one, there is obtained the 17α-bromoethynyl-1,4-androstadiene-17β-methoxy-3-one.

Example 18

A suspension of 1 g. of 17α-chloroethynyl-4-androstene-17β-ol-3-one and 2.4 of chloranil in 30 ml. of ethyl acetate and 6 ml. of acetic acid is stirred and refluxed for 16 hours. The reaction mixture is cooled and filtered. The product is washed sequentially with aqueous bisulfite, aqueous potassium hydroxide and water. Chromatography yields 17α - chloroethynyl - 4,6 - androstadiene-17β-ol-3-one which on crystallization from ethyl acetate has the following properties:

M.P. 209–211° C., $\alpha_D^{25}$ −159° (c. 0.9 CHCl₃), U.V.

$$\lambda_{max.}^{methanol}\ 283\ m\mu,\ \epsilon\ 26{,}900$$

Calculated for $C_{21}H_{25}O_2Cl$: C, 73.15; H, 7.31. Found: C, 73.08; H, 7.06.

A solution of 675 mg. of 17α-chloroethynyl-4,6-androstadiene - 17β - ol - 3 - one in 30 ml. of ether and 30 ml. of 0.30 N perbenzoic acid in benzene is allowed to stand in the dark for 68 hours. The solution is washed sequentially with aqueous sodium bisulfite, water, 2.5 N potassium hydroxide and water. The organic layer is dried and concentrated in vacuo. Chromatography on acid-washed alumina and elution with ether affords about 180 mg. of the 17α - chloroethynyl - 4 - androstene - 17β-ol - 3 - one - 6,7 - oxide, which has the following properties:

M.P. 196–216° C., U.V. $\lambda_{max.}^{MeOH}$ 240 m$\mu$, E% 377

A solution of 140 mg. of the oxide in 10 ml. of 0.4 N hydrogen chloride in chloroform is allowed to stand at room temperature for 5.5 hours. The solution is poured onto ice. Aqueous sodium bicarbonate solution is added and the product is extracted with chloroform. The organic layer is washed with water, dried and concentrated. Crystallization from ether affords 84 mg. of 6 - chloro - 17α - chloroethynyl - 4,6 - androstadiene - 17β-ol-3-one, M.P. 195–205° C. The sample for analysis is crystallized from methanol and has the following properties:

M.P. 203–208° C., $\alpha_D^{24}$ −96 (c. 1.0 CHCl₃), U.V.

$$\lambda_{max.}^{MeOH}\ 285\ m\mu,\ \epsilon\ 21{,}400$$

Calculated for $C_{21}H_{24}O_2Cl_2$: C, 66.49; H, 6.38. Found: C, 66.28; H, 6.62.

In accordance with the above procedures, but starting with the 17α - bromoethynyl - 4 - androstene - 17β - ol - 3-one in place of the 17α - chloroethynyl - 4 - androstene-17β-ol-3-one, there is obtained as intermediate, the 17α-bromoethynyl - 4 - androstene - 17β - ol - 3 - one - 6,7-oxide, and as product, the 6 - chloro - 17 - bromoethynyl-4,6-androstadiene-17β-ol-3-one.

A solution of 125 mg. of 6 - chloro - 17α - chloroethynyl - 4,6 - androstadiene - 17β - ol - 3 - one in 1.8 ml. of pyridine and 1.5 ml. of acetic anhydride is heated on the steam bath overnight. The solution is poured into ice water and extracted with ether. The ether solution is washed sequentially with dilute hydrochloric acid, water and sodium bicarbonate solution. Chromatography on 7.0 g. of acid-washed alumina, and elution with ether-petroleum ether mixtures affords 56 mg. of 6 - chloro-17α - chloroethynyl - 4,6 - androstadiene - 17β - ol - 3-one acetate. The sample for analysis is crystallized from ether and has the following properties:

M.P. 203–208° C., $\alpha_D^{24}$ −98° (c. 0.9 CHCl₃), U.V.

$$\lambda_{max.}^{MeOH}\ 284\ m\mu,\ \epsilon\ 21{,}300$$

Calculated for $C_{23}H_{26}O_3Cl_2$: C, 65.57; H, 6.21. Found: C, 66.06; H, 6.16.

In accordance with the above procedures, but starting with the 6 - chloro - 17α - bromoethynyl - 4,6 - androstadiene - 17β - ol - 3 - one in place of the 6 - chloro - 17α-chloroethynyl - 4,6 - androstadiene -17β - ol - 3 - one, there is obtained the 6 - chloro - 17α - bromoethynyl - 4,6-androstadiene - 17β - ol - 3 - one acetate.

Example 19

To 100 mg. of 6α - chloro - 17α - chloroethynyl - 4,6-androstadiene - 17β - ol - 3 - one acetate in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, water, dilute hydrochloric acid and water, and then dried over magnesium sulfate. The extract is treated with activated charcoal and then concentrated to dryness. Crystallization of the residue gives 6 - chloro - 17α - chloroethynyl - 1,4,6 - androstatriene - 17β - ol - 3 - one acetate.

*Corynebacterium simplex* (ATCC 6,946) is inoculated from a slant to 250 ml. shake flasks containing a medium having the composition: 1 g./liter yeast extract (Difco). After an 18 hour growth phase at 28° C., 10 mg. of 6-chloro - 17α - chloroethynyl - 4,6 - androstadiene - 17β-ol-3-one acetate is added to each flask as a dimethylformamide solution (100 mg./ml.). After a 24 hours transformation period at 28° C., the cells are centrifuged, followed by three ethyl acetate extracts of the cell-free broth. The extracts are combined and concentrated in vacuo. The 6 - chloro - 17α - chloroethynyl - 1,4,6 - androstatriene - 17β - ol - 3 - one acetate is crystallized directly from the concentrate. Paper chromatography of the product is a system utilizing formamide as the stationary phase and chloroform-benzene (1:1) as the mobile phase indicates that the product possesses a polarity slightly greater than the substrate.

*Septomyxa affinis* (ATCC 6,737) is inoculated from a slant into 250 ml. shake flasks containing 50 ml. of the following medium: 2% Edamin (Sheffield Farms), 5% glucose, and 0.5% corn steep liquor. After a 48 hours incubation at 28° C., 10 mg. of 6-chloro-17α-chloroethynyl-4,6-androstadiene-17β-ol-3-one acetate is added to each shake flask as a dimethylformamide solution (100 mg./ml.). After a conversion period of 24 hours, the cells are removed by filtration, followed by three successive extractions wtih equal volume of ethyl acetate. The extracts are combined and concentrated in vacuo.

The product is re-acetylated by treatment with acetic anhydride and pyridine, and then purified by recrystallization to give the 6-chloro-17α-chloroethynyl-1,4,6-androstatriene-17β-ol-3-one acetate. Descending paper chromatography of the product in a system using formamide as the stationary phase and chloroform as the mobile phase, shows some of the steroid substrate, but is largely the somewhat more polar Δ'-dehydrogenation product.

In accordance with the above procedures, but using the 6 - chloro - 17α-bromoethynyl-4,6-androstadiene-17β-ol-3-one in place of the 6-chloro-17α-chloroethynyl-4,6-androstadiene-17β-ol-3-one, there is obtained the 6-chloro-17α-bromoethynyl-1,4,6-androstatriene-17β-ol-3-one acetate.

Example 20

A mixture of 500 mg. of 6-chloro-17α-chloroethynyl-4,6-androstadiene-17β-ol-3-one, 10 ml. of dimethylformamide, 20 ml. of methyl iodide, and 1.5 gms. of silver oxide is stirred at room temperature for 4 days. An additional ½ gm. of silver oxide is added at the end of each day. 100 ml. of chloroform is then added to the reaction mixture which is then stirred for one hour, filtered. The filtrate is then taken to dryness. The oil is chromatographed with acid-washed alumina and eluted with mixtures of ether and petroleum ether to give the 6-chloro-17α - chloroethynyl-17β-methoxy-4,6-androstadiene-3-one.

In accordance with the above procedures, but starting with the 6-chloro-17α-bromoethynyl-4,6-androstadiene-17-ol-3-one in place of the 6-chloro-17α-chloroethynyl-4,6-androstadiene-17β-ol-3-one there is obtained the 6-chloro - 17α - bromoethynyl-17β-methoxy-4,6-androstadiene-3-one.

Example 21

To 100 mg. of 6-chloro-17α-chloroethynyl-17β-methoxy-4,6-androstadiene-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives the 6-chloro-17α - chloroethynyl - 17β-methoxy-1,4,6-androstatriene-3-one.

*Septomyxa affinis* (ATCC 6,737) is inoculated from a slant into 250 ml. shake flasks containing 50 ml. of the following medium: 2% Edamin (Sheffield Farms), 5% glucose, and 0.5% corn steep liquor. After a 48 hour incubation at 28° C., 10 mg. of 6-chloro-17α-chloroethynyl-17β-methoxy-4,6-androstadiene-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 6 - chloro - 17α-chloroethynyl-17β-methoxy-1,4,6-androstatriene-3-one is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

*Bacillus sphaericus* (ATCC 12,488) is inoculated from a slant into 250 ml. shake flasks containing 50 ml. of the following medium: 2% Edamin (Sheffield Farms), 5% glucose, and 0.5% corn steep liquor. After a 24 hour incubation at 28° C., 10 mg. of 6-chloro-17α-chloroethynyl-4,6-androstadiene-17β-methoxy-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 6-chloro-17α-chloroethynyl-17β-methoxy-1,4,6-androstatriene-3-one is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

In accordance with the above procedures, but using the 6 - chloro-17α-bromoethynyl-4,6-androstadiene-17β-methoxy-3-one in place of the 6-chloro-17α-chloroethynyl-4,6-androstadiene-17β-methoxy-3-one, there is obtained the 6-chloro - 17α-bromoethynyl-1,4,6-androstatriene-17β-methoxy-3-one.

Example 22

A solution of the 17α-chloroethynyl-3,5-androstadiene-3β,17β-diol diacetate (Example 10) in aqueous tetrahydrofuran is treated with a slow stream of perchloryl fluoride for one hour and then allowed to stand at room temperature for an additional 2 hours. The reaction mixture is poured on ice and extracted with chloroform. The chloroform layer is washed with aqueous bicarbonate solution, dried and concentrated in vacuo. The crude material is dissolved in acetic acid saturated with gaseous hydrogen chloride and allowed to stand for one hour at room temperature. The reaction mixture is poured on ice and extracted with chloroform. The chloroform layer is washed with aqueous bicarbonate solution, dried and concentrated in vacuo. The concentrate is chromatographed on acid-washed alumina to yield the 6α-fluoro-17α-chloroethynyl-4-androstene-17β-ol-3-one acetate.

In accordance with the above procedures, but starting with the 17α-bromoethynyl-3,5-androstadiene-3β,17β-diol diacetate in place of the 17α-chloroethynyl-3,5-androstadiene-3β,17β-diol diacetate there is obtained the 6α-fluoro-17α-bromoethynyl-4-androstene-17β - ol-3-one acetate.

Example 23

To 100 mg. of 6α-fluoro-17α-chloroethynyl-4-androstene-17β-ol-3-one acetate in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, water, dilute hydrochloric acid and water, and then dried over magnesium sulfate. The extract is treated with activated charcoal and then concentrated to dryness. Crystallization of the residue from a mixture of acetone and ether gives 6α-fluoro-17α-chloroethynyl-1,4-androstadiene - 17β-ol-3-one acetate.

*Corynebacterium simplex* (ATCC 6,946) is inoculated from a slant to 250 ml. shake flasks containing a medium having the composition: 1 g./liter yeast extract (Difco). After an 18 hour growth phase at 28° C., 10 mg. of 6α-fluoro-17α - chloroethynyl-4-androstene-17β-ol-3-one acetate is added to each flask as a dimethylformamide solution (100 mg./ml.). After a 24 hour transformation period at 28° C., the cells are centrifuged, followed by three ethyl acetate extracts of the cell-free broth. The extracts are combined and concentrated in vacuo. The 6α-fluoro-17α-chloroethynyl-1,4-androstadiene-17β-ol-3-one acetate is crystallized directly from the concentrate. Paper chromatography of the product is a system utilizing formamide as the stationary and chloroform-benzene (1:1) as the mobile phase indicates that the product possesses a polarity slightly greater than the substrate.

*Septomyxa affinis* (ATCC 6,737) is inoculated from a slant into 250 ml. shake flasks containing 50 ml. of the following medium: 2% Edamin (Sheffield Farms), 5% glucose, and 0.5% corn steep liquor. After a 48 hour incubation at 28° C., 10 mg. of 6α-fluoro-17α-chloroethynyl-4-androstene-17β-ol-3-one acetate is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The product is re-acetylated by treatment with acetic anhydride and pyridine, and then purified by recrystallization to give the 6α-fluoro-17α-chloroethynyl-1,4-androstadiene-17β - ol-3-one acetate. Descending paper chromatography of the product in a system using formamide as the stationary phase and chloroform as the mobile phase, shows some of the steroid substrate, but is largely the somewhat more polar Δ'-dehydrogenation product.

In accordance with the above procedures, but using the 6α-fluoro-17α - bromoethynyl-4-androstene - 17β-ol-3-one acetate in place of the 6α-fluoro-17α-chloroethynyl-4-androstene-17β-ol-3-one acetate there is obtained the 6α-fluoro-17α-bromoethynyl-1,4-androstadiene - 17β-ol-3-one acetate.

Example 24

A suspension of 1 g. of 6α-fluoro-17α-chloroethynyl-4-androstene-17β-ol-3-one acetate 2.4 g. chloranil, 30 ml. ethyl acetate and 6 ml. of acetic acid is stirred and refluxed for 16 hours. The reaction mixture is cooled and filtered. The product is washed sequentially with aqueous bisulfite, aqueous potassium hydroxide and water.

The organic layer is dried and concentrated in vacuo. Chromatography yields 6-fluoro-17α-chloroethynyl-4,6-androstadiene-17β-ol-3-one acetate.

In accordance with the above procedures, but starting with the 6α-fluoro-17α-bromoethynyl-4-androstene-17β-ol-3-one acetate in place of the 6α-fluoro-17α-chloroethynyl-4-androstene-17β-ol-3-one acetate there is obtained the 6-fluoro-17α-bromoethynyl-4,6-androstadiene-17β-ol-one acetate.

*Example 25*

To 100 mg. of 6-fluoro-17α-chloroethynyl-4,6-androstadiene-17β-ol-3-one acetate in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, water, dilute hydrochloric acid and water, and then dried over magnesium sulfate. The extract is treated with activated charcoal and then concentrated to dryness. Crystallization of the residue gives 6-fluoro-17α-chloroethynyl-1,4,6-androstatriene-17β-ol-3-one acetate.

In accordance with the above procedures, but starting with the 6-fluoro-17α-bromoethynyl-4,6-androstadiene-17β-ol-3-one acetate in place of the 6-fluoro-17α-chloroethynyl-4,6-androstadiene-17β-ol-3-one acetate, there is obtained the 6-fluoro-17α-bromoethynyl - 1,4,6 - androstatriene-17β-ol-3-one acetate.

*Corynebacterium simplex* (ATCC 6,946) is inoculated from a slant to 250 ml. shake flasks containing a medium having the composition: 1 g./liter yeast extract (Difco). After an 18 hour growth phase at 28° C., 10 mg. of 6 - fluoro-17α-chloroethynyl - 4,6 - androstadiene-17β-ol-3-one acetate is added to each flask as a dimethylformamide solution (100 mg./ml.). After a 24 hour transformation period at 28° C., the cells are centrifuged, followed by three ethyl acetate extracts of the cell-free broth. The extracts are combined and concentrated in vacuo. The 6-fluoro-17α-chloroethynyl-1,4,6-androstatriene-17β-ol-3-one acetate is crystallized directly from the concentrate. Paper chromatography of the product in a system utilizing formamide as the stationary phase and chloroform-benzene (1:1) as the mobile phase indicates that the product possesses a polarity slightly greater than the substrate.

*Septomyxa affinis* (ATCC 6,737) is inoculated from a slant into 250 ml. shake flasks containing 50 ml. of the following medium: 2% Edamin (Sheffield Farms), 5% glucose, and 0.5% corn steep liquor. After a 48 hour incubation at 28° C., 10 mg. of 6-fluoro-17α-chloroethynyl-4,6-androstadiene-17β-ol-3-one acetate is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The product is re-acetylated by treatment with acetic anhydride and pyridine, and then purified by recrystallization to give the 6α-fluoro-17α-chloroethynyl-1,4,6-androstatriene-17β-ol-3-one acetate. Descending paper chromatography of the product in a system using formamide as the stationary phase and chloroform as the mobile phase, shows some of the steroid substrate, but is largely the somewhat more polar Δ'-dehydrogenation product.

In accordance with the above procedures, but using the 6-fluoro-17α-bromoethynyl - 4,6 - androstadiene-17β-ol-3-one acetate in place of the 6-fluoro-17α-chloroethynyl-4,6-androstadiene-17β-ol-3-one acetate, there is obtained the 6-fluoro-17α-bromoethynyl - 1,4,6 - androstatriene-17β-ol-3-one acetate.

*Example 26*

A solution of the 17α-chloroethynyl-3,5-androstadiene-17β-methoxy-3β-ol in aqueous tetrahydrofuran is treated with a slow stream of perchloryl fluoride for one hour and then allowed to stand at room temperature for an additional 2 hours. The reaction mixture is poured on ice and extracted wtih chloroform. The chloroform layer is washed with aqueous bicarbonate solution, dried and concentrated in vacuo. The crude material is dissolved in acetic acid saturated with gaseous hydrogen chloride and allowed to stand for one hour at room temperature. The reaction mixture is poured on ice and extracted with chloroform. The chloroform layer is washed with aqueous bicarbonate solution, dried and concentrated in vacuo. The concentrate is chromatographed on acid-washed alumina to yield the 6α-fluoro-17α-chloroethynyl-4-androstene-17β-methoxy-3-one.

In accordance with the above procedures, but starting with the 17α-bromoethynyl-3,5-androstadiene-17β-methoxy-3β-ol in place of the 17α-chloroethynyl-3,5-androstadiene-17β-methoxy-3β-ol, there is obtained the 6α-fluoro-17α-bromoethynyl-4-androstene - 17β - methoxy-3-one.

*Example 27*

To 100 mg. of 6α-fluoro-17α-chloroethynyl-4-androstene-17β-methoxy-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, water, dilute hydrochloric acid and water, and then dried over magnesium sulfate. The extract is treated with activated charcoal and then concentrated to dryness. Crystallization of the residue gives 6α-fluoro-17α-chloroethynyl-1,4-androstadiene-17β-methoxy-3-one.

*Septomyxa affinis* (ATCC 6,737) is inoculated from a slant into 250 ml. shake flasks containing 50 ml. of the following medium: 2% Edamin (Sheffield Farms), 5% glucose, and 0.5% corn steep liquor. After a 48 hour incubation at 28° C., 10 mg. of 6α-fluoro-17α-chloroethynyl-4-androstene-17β-methoxy-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 6α-fluoro-17α-chloroethynyl - 1,4 - androstadiene-17β-methoxy-3-one is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

*Bacillus sphaericus* (ATCC 12,488) is inoculated from a slant into 250 ml. shake flasks containing 50 ml. of the following medium: 2% Edamin (Sheffield Farms), 5% glucose, and 0.5% corn steep liquor. After a 24 hour incubation at 28° C., 10 mg. of 6α-fluoro-17α-chloroethynyl-4-androstene-17β-methoxy-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 6α-fluoro-17α-chloroethynyl-1,4-androstadiene-17β-methoxy-3-one is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

In accordance with the above procedures, but using the 6α-fluoro-17α-bromoethynyl-4-androstene-17β-methoxy-3-one in place of the 6α-fluoro-17α-chloroethynyl-4-androstene-17β-methoxy-3-one, there is obtained the 6α-fluoro-17α-bromoethynyl-1,4-androstadiene-17β-methoxy-3-one.

*Example 28*

A suspension of 1 g. of 6α-fluoro-17α-chloroethynyl-4-androstene-17β-methoxy-3-one, 2.4 g. chloranil, 30 ml. ethyl acetate and 6 ml. of acetic acid is stirred and refluxed for 16 hours. The reaction mixture is cooled and filtered. The product is washed sequentially with aqueous bisulfite, aqueous potassium hydroxide and water. The organic layer is dried and concentrated in vacuo. Chromatography yields 6-fluoro-17α-chloroethynyl-4,6-androstadiene-17β-methoxy-3-one.

*Example 29*

To 100 mg. of 6-fluoro-17α-chloroethynyl-4,6-androstadiene-17β-methoxy-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, water, dilute hydrochloric acid and water, and then dried over magnesium sulfate. The extract is treated with activated charcoal and then concentrated to dryness. Crystallization of the residue gives 6-fluoro-17α-chloroethynyl-1,4,6-androstatriene-17β-methoxy-3-one.

*Septomyxa affinis* (ATCC 6,737) is inoculated from a slant into 250 ml. shake flasks containing 50 ml. of the following medium: 2% Edamin (Sheffield Farms), 5% glucose, and 0.5% corn steep liquor. After a 48 hour incubation at 28° C., 10 mg. of 6-fluoro-17α-chloroethynyl-4,6-androstadiene-17β-methoxy-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 6-fluoro-17α-chloroethynyl-1,4,6-androstatriene-17β-methoxy-3-one is readily crystallized from the concentrate. Descending paper chromatography of the product in a system using formamide as the stationary phase and chloroform as the mobile phase, shows some of the steroid substrate, but is largely the somewhat more polar Δ¹-dehydrogenation product.

*Bacillus sphaericus* (ATCC 12,488) is inoculated from a slant into 250 ml. shake flasks containing 50 ml. of the following medium: 2% Edamin (Sheffield Farms), 5% glucose, and 0.5% corn steep liquor. After a 24 hour incubation at 28° C., 10 mg. of 6-fluoro-17α-chloroethynyl-4,6-androstadiene-17β-methoxy-3-one is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 6-fluoro-17α-chloroethynyl-1,4,6-androstatriene-17β-methoxy-3-one is readily crystallized from the concentrate. Descending paper chromatography of the product in a system using formamide as the stationary phase and chloroform as the mobile phase, shows some of the steroid substrate, but is largely the somewhat more polar Δ¹-dehydrogenation product.

In accordance with the above procedure, but using the 6α-fluoro-17α-bromoethynyl-4,6-androstadiene-17β-methoxy-3-one in place of the 6α-fluoro-17α-chloroethynyl-4,6-androstadiene-17β-methoxy-3-one, there is obtained the 6-fluoro-17α-bromoethynyl-1,4,6-androstatriene-17β-methoxy-3-one.

*Example 30*

A solution of 100 mg. of the 17α-chloroethynyl-4-androstene-17β-ol-3-one and 50 mg. of Lindlar catalyst in 10 cc. of ethyl acetate is treated with hydrogen until one mole of hydrogen has been absorbed. The mixture is filtered and concentrated. Chromatography yields the pure product 21-chloro-4,20-pregnadiene-17β-ol-3-one.

In accordance with the above procedures, but starting with the 17α-bromoethynyl-4-androstene-17β-ol-3-one in place of the 17α-chloroethynyl-4-androstene-17β-ol-3-one there is obtained the 21-chloro-4,20-pregnadiene-17β-ol-3-one.

A suspension of platinum oxide in 10 cc. of ethanol is reduced and 100 mg. of 17α-chloroethynyl-4-androstene-17β-ol-3-one is added. Reduction proceeds until two moles of hydrogen have been absorbed. The solution is filtered, concentrated and chromatographed on alumina to yield the 21-chloro-4-pregnene-17β-ol-3-one.

In accordance with the above procedures, but starting with the 17α-bromoethynyl-4-androstene-17β-ol-3-one in place of the 17α-chloroethynyl-4-androstene-17β-ol-3-one there is obtained the 21-chloro-4-pregnene-17β-ol-3-one.

*Example 31*

A mixture of 1 g. of 17α-chloroethynyl-19-nor-4-androstene-17β-ol-3-one, 10 ml. of acetic anhydride and 100 mg. of p-toluenesulfonic acid is heated on the steam bath for one hour and allowed to stand overnight at room temperature. It is then poured into ice water and left to stand at room temperature for one half hour. The reaction mixture is then extracted with ether. The ether extract is washed with water and aqueous sodium bicarbonate, dried, and concentrated to yield the crude 17α-chloroethynyl-19-nor-3,5-androstadiene-3,17β, diol diacetate.

A solution of 8 gms. of 17α-chloroethynyl-19-nor-3,5-androstadiene-3,17β-diol diacetate in a mixture of 700 ml. of 95% ethanol and 300 ml. of tetrahydrofuran is cooled to 10° C. and added dropwise, with occasional stirring, over a one hour period, to a cold (0° C.) solution of 18 g. sodium borohydride in 400 ml. of 80% ethanol, the reaction temperature not being allowed to exceed 5° C. After completion of the addition, the solution is held at 0–5° C. for an additional two hours. A solution of NaH₂PO₄ is then added to adjust the pH to about 5. The mixture is then concentrated in vacuo to a small volume, diluted with water and extracted with chloroform. The extract is washed with water, dried and concentrated. The concentrate is chromatographed over acid-washed alumina and eluted with ether-petroleum ether mixtures to give 17α-chloroethynyl-19-nor-5-androstene-3β,17β-diol 17-acetate.

Ten grams of 17α-chloroethynyl-19-nor-5-androstene-3β,17β-diol-17-acetate in 150 ml. of tetrahydrofuran is treated with 100 ml. of 0.9 m. monoperphthalic acid in ethyl acetate and allowed to stand overnight at room temperature. The reaction mixture is diluted with ethyl acetate and washed sequentially with aqueous sodium bicarbonate, sodium bisulfite, and sodium bicarbonate solution. The organic layer is dried and concentrated in vacuo. The product is fractionally crystallized from aqueous ethanol to yield the 17α-chloroethynyl-19-nor-androstane-3β,17β-diol-5,6α-oxide-17-acetate.

Five grams of 17α-chloroethynyl-19-nor-androstane-3β,17β-diol-5,6α-oxide-17-acetate in benzene is added to a reagent prepared from 3.4 g. of magnesium, 10 ml. of methyl iodide and 45 ml. of ether. The mixture is stirred and 70 ml. of solvent is removed by distillation. After refluxing for 5 hours, the mixture is cooled, acidified with dilute hydrochloric acid and the organic layer washed to neutrality. The organic phase is dried and concentrated in vacuo. Crystallization from aqueous ethanol gives the 6β-methyl-17α-chloroethynyl-19-nor-androstane-3β,5α,17β-triol.

The oxidizing reagent is prepared by diluting 2.7 g. of $C_2O_3$ and 2.3 ml. of concentrated sulfuric acid to 10 ml. with water. A solution of 1.90 g. of 6β-methyl-17α-chloroethynyl-19-nor-androstane-6β,5α,17β-triol in 300 ml. of acetone is cooled to 0° and treated with 1.85 ml. of the oxidizing reagent. The solution is diluted with ice water and extracted with ether. The ether extract is washed sequentially with water, and aqueous sodium bicarbonate and then dried and concentrated in vacuo, to give 6β-methyl-17α-chloroethynyl - 19 - nor - androstane-5α,17β-diol-3-one. The crude product, dissolved in 150 ml. of methanol, 75 ml. of 1 N sodium hydroxide is added and the mixture is stirred at room temperature under nitrogen for 24 hours. The mixture is concentrated to half volume under vacuo at 25° C. and then poured into ice water. The product is extracted with ether. The ether layer is washed with water, dried and concentrated. The concentrate is chromatographed on acid-washed alumina and the product eluted with ether-petroleum ether mixtures to yield 6α-methyl-17α-chloroethynyl-19-nor-4-androstene-17β-ol-3-one.

In accordance with the above procedures, but starting with the 17α-bromoethynyl-19-nor-4-androstene-17β-ol-3-one in place of the 17α-chloroethynyl-19-nor-4-androstene-17β-ol-3-one there is obtained as intermediates, the 17α-bromoethynyl-19-nor-3,5-androstadiene-3,17β-diol diacetate, 17α-bromoethynyl - 19 - nor-5-androstene-3β,17β-diol, 17α-bromoethynyl - 19 - nor-androstane-3β,17β-diol-5,6α-oxide-17-acetate, and 6β-methyl-17α-bromoethynyl-19-nor-androstane-3β,5α,17β-triol, and as product, the 6α-methyl-17α-bromoethynyl-19-nor-4-androstene-17β-ol-3-one.

Example 32

100 mg. of 6α - methyl - 17α-chloroethynyl-19-nor-4-androstene-17β-ol-3-one is heated with 1 cc. of acetic anhydride and 1.2 cc. of pyridine on the steam bath overnight. The reaction mixture is then poured onto ice and extracted with chloroform. The extract is washed with water and concentrated. The concentrate is chromatographed over acid-washed alumina and eluted with mixtures of ether-petroleum and ether to give 6α-methyl-17α-chloroethynyl-19-nor-4-androstene-17β-ol-3-one acetate.

In accordance with the above procedures, but starting with the 6α-methyl-17α-bromoethynyl - 19 - nor-4-androstene-17β-ol-3-one in place of the 6α-methyl-17α-chloroethynyl-19-nor-4-androstene-17β-ol-3-one, there is obtained the 6α-methyl-17α-bromoethynyl-19-nor-4-androstene-17β-ol-3-one acetate.

A mixture of 500 mg. of the 6α-methyl-17α-chloroethynyl-19-nor-4-androstene-17β-ol-3-one, 10 ml. of dimethylformamide, 20 ml. of methyl iodide, and 1.5 gms. of silver oxide is stirred at room temperature for 4 days. An additional ½ gm. of silver oxide is added at the end of each day. One hundred ml. of chloroform is then added to the reaction mixture which is then stirred for one hour, filtered, and the filtrate is evaporated to dryness. The residual oil is chromatographed with acid-washed alumina and eluted with mixtures of ether and petroleum ether to give 6α-methyl-17α-chloroethynyl-19-nor-4-androstene-17β-methoxy-3-one.

In accordance with the above procedures, but starting with the 6α-methyl-17α-bromoethynyl - 19 - nor-4-androstene-17β-ol-3-one in place of the 6α-methyl-17α-chloroethynyl-19-nor-4-androstene-17β-ol-3-one, there is obtained the 6α-methyl-17α-bromoethynyl-19-nor-4-androstene-17β-methoxy-3-one.

Example 33

To a solution of 200 mg. of the 17α-chloroethynyl-19-nor-3,5-androstadiene-3,17β-diol diacetate (Example 17) dissolved in 2 ml. of acetic acid is added, with stirring, 56 ml. of N-chlorosuccinimide and 2 ml. of tetrahydrofuran containing 5% of dry HCl. The reaction is stirred at room temperature for 2½ hours. Sodium bicarbonate is added. The reaction mixture is then extracted with ether. The ether extracts are dried and concentrated. The material is chromatographed over acid-washed alumina, and eluted with ether-petroleum ether mixtures to give 6α-chloro-17α-chloroethynyl-19-nor-4-androstene-17β-ol-3-one acetate.

In accordance with the above procedures, but starting with the 17α - bromethynyl - 19-nor - 3,5 - androstadiene-3,17β-diol diacetate in place of the 17α-chloroethynyl-19-nor-3,5-androstadiene - 3,17β - diol diacetate there is obtained the 6α-chloro-17α-bromoethynyl-19-nor-4-androstene-17β-ol-3-one acetate.

Example 34

A solution of the 17α-chloroethynyl-19-nor-3,5-androstadiene-3,17β-diol diacetate in aqueous tetrahydrofuran is treated with a slow stream of perchloryl fluoride for one hour and then allowed to stand at room temperature for an additional 2 hours. The reaction mixture is poured on ice and extracted with chloroform. The chloroform layer is washed with aqueous bicarbonate solution, dried and concentrated in vacuo. The crude material is dissolved in acetic acid saturated with gaseous hydrogen chloride and allowed to stand for one hour at room temperature. The reaction mixture is poured on ice and extracted with chloroform. The chloroform layer is washed with aqueous bicarbonate solution, dried and concentrated in vacuo. The concentrate is chromatographed on acid-washed alumina to yield the 6α-fluoro-17α-chloroethynyl-19-nor-4-androstene-17β-ol-3-one acetate.

In accordance with the above procedures, but starting with the 17α - bromoethynyl - 19 - nor-3,5-androstadiene-3,17β-diol diacetate in place of the 17α-chloroethynyl-19-nor-3,5 - androstadiene-3,17β - diol diacetate there is obtained the 6α-fluoro-17α-bromoethynyl-19 - nor - 4-androstene-17β-ol-3-one acetate.

A mixture of 500 mg. of the 17α-chloroethynyl-19-nor-4 - androstene-17β - ol -3- one (Example 3) 10 ml. of dimethylformamide, 20 ml. of methyl iodide, and 1.5 gm. of silver oxide is stirred at room temperature for 4 days. An additional ½ gm. of silver oxide is added at the end of each day. One hundred ml. of chloroform is then added to the reaction mixture which is then stirred for one hour, filtered, and the filtrate is evaporated to dryness. The residual oil is chromatographed with acid-washed alumina and eluted with mixtures of ether and petroleum ether to give 17α-chloroethynyl-19-nor-4-androstene-17β-methoxy-3-one.

In accordance with the above procedures, but starting with the 17α-bromoethynyl-19-nor-4-androstene-17β-ol-3-one in place of the 17α-chloroethynyl-19-nor-4-androstene - 17β - ol - 3-one there is obtained the 17α - bromoethynyl-19-nor-4-androstene-17β-methoxy-3-one.

A mixture of 1 g. of 17α-chloroethynyl-19-nor-4-androstene-17β-methoxy-3-one, 10 ml. of acetic anhydride and 100 mg. of p-toluenesulfonic acid is heated on the steam bath for one hour and allowed to stand overnight at room temperature. It is then poured into ice water and left to stand at room temperature for one half hour. The reaction mixture is then extracted with ether. The ether extract is washed with water and aqueous sodium bicarbonate, dried, and concentrated to yield the crude 17α-chloroethynyl - 19 - nor - 3,5 - androstadiene - 17β - methoxy - 3-ol acetate.

In accordance with the above procedures, but starting with the 17α - bromoethynyl - 19 - nor-4-androstene-17β-methoxy-3-one in place of the 17α-chloroethynyl-19-nor-4-androstene-17β-methoxy-3-one, there is obtained the 17α - bromoethynyl - 19 - nor - 3,5 - androstadiene - 17β-methoxy-3-ol acetate.

To a solution of 200 mg. of the 17α-chloroethynyl-19-nor-3,5-androstadiene-17β-methoxy-3-ol acetate dissolved in 2 ml. of acetic acid is added, with stirring, 56 ml. of N-chlorosuccinimide and 2 ml. of tetrahydrofuran containing 5% of dry HCl. The reaction is stirred at room temperature for 2½ hours. Sodium bicarbonate is added. The reaction mixture is then extracted with ether. The ether extracts are dried and concentrated. The material is chromatographed over acid-washed alumina, and eluted with ether-petroleum ether mixtures to give 6α-chloro-17α-chloroethynyl-19-nor-4 - androstene - 17β - methoxy-3-one In accordance with the above procedures, but starting with the 17α-bromoethynyl-19-nor-3,5-androstadiene-17β-methoxy-3-ol acetate in place of the 17α-chloroethynyl-19-nor-3,5-androstadiene-17β-methoxy-3-ol acetate there is obtained the 6α-chloro-17α-bromoethynyl-19-nor-4-androstene-17β-methoxy-3-one.

*Example 35*

A solution of the 17α-chloroethynyl-19-nor-3,5-androstadiene-17β-methoxy-3-ol acetate in aqueous tetrahydrofuran is treated with a slow stream of perchloryl fluoride for one hour and then allowed to stand at room temperature for an additional 2 hours. The reaction mixture is poured on ice and extracted with chloroform. The chloroform layer is washed with aqueous bicarbonate solution, dried and concentrated in vacuo. The crude material is dissolved in acetic acid saturated with gaseous hydrogen chloride and allowed to stand for one hour at room temperature. The reaction mixture is poured on ice and extracted with chloroform. The chloroform layer is washed with aqueous bicarbonate solution, dried and concentrated in vacuo. The concentrate is chromatographed on acid-washed alumina to yield the 6α-fluoro-17α-chloroethynyl-19-nor-4-androstene-17β-methoxy-3-one.

In accordance with the above procedures, but starting with the 17α-bromoethynyl-19-nor-3,5-androstadiene-17β-methoxy-3-ol acetate in place of the 17α-chloroethynyl-19-nor-3,5-androstadiene-17β-methoxy-3-ol acetate, there is obtained the 6-fluoro-17α-bromoethynyl-19-nor - 4 - androstene-17β-methoxy-3-one.

*Example 36*

A solution of 100 mg. of the 17α-chloroethynyl-19-nor-4-androstene-17β-ol-3-one and 50 mg. of Lindlar catalyst in 10 cc. of ethyl acetate is treated with hydrogen until one mole of hydrogen has been absorbed. The mixture is filtered and concentrated to yield the crude chlorovinyl compound. Chromatography yields the pure product 21-chloro-19-nor-4,20-pregnadiene-17β-ol-3-one.

In accordance with the above procedure, but starting with the 17α-bromoethynyl-19-nor-4-androstene-17β-ol-3-one, the 17α-chloroethynyl-19-nor-5(10)-androstene-17β-ol-3-one, or the 17α-bromoethynyl-19-nor-5(10)-androstene-17β-ol-3-one, in place of the 17α-chloroethynyl-19-nor-4-androstene-17β-ol-3-one, there is obtained the 21-bromo-19-nor-4,20-pregnadiene-17β-ol-3-one, 21-chloro-19-nor-5(10),20-pregnadiene-17β-ol-3-one, or 21-bromo-19-nor-5(10),20-pregnadiene-17β-ol-3-one respectively.

*Example 37*

A suspension of platinum oxide in 10 cc. of ethanol is reduced and 100 mg. of 17α-chloroethynyl-19-nor-4-androstene-17β-ol-3-one is added. Reduction proceeds until two moles of hydrogen have been absorbed. The solution is filtered, concentrated and chromatographed on alumina to yield the 21-chloro-19-nor-4-pregnene-17β-ol-3-one.

In accordance with the above procedure, but starting with the 17α-bromoethynyl-19-nor-4-androstene-17β-ol-3-one, the 17α-chloroethynyl-19-nor-5(10)-androstene-17β-ol-3-one, or the 17α-bromoethynyl-19-nor-5(10)-androstene-17β-ol-3-one in place of the 17α-chloroethynyl-19-nor-4-androstene-17β-ol-3-one, there is obtained the 21-bromo-19-nor-4-pregnene-17β-ol-3-one, the 21-chloro-19-nor-5(10)-pregnene-17β-ol-3-one, or the 21-bromo-19-nor-5(10)-pregnene-17β-ol-3-one respectively.

We claim:

1. 17α-chloroethynyl-4,6-androstadiene-17β-ol-3-one.
2. 17α-chloroethynyl-1,4-androstadiene-17β-methoxy-3-one.
3. 17α-bromoethynyl-1,4-androstadiene-17β-methoxy-3-one.
4. 6α - fluoro-17α-chloroethynyl-4-androstene-17β-ol-3-one-acetate.
5. 6α - fluoro-17α-bromoethynyl-4-androstene-17β-ol-3-one-acetate.
6. 6α - fluoro-17α-chloroethynyl-1,4-androstadiene-17β-ol-3-one acetate.
7. 6α - fluoro-17α-bromoethynyl-1,4-androstadiene-17β-ol-3-one acetate.
8. 6-fluoro-17α-chloroethynyl-4,6-androstadiene-17β-ol-3-one acetate.
9. 6-fluoro-17α-bromoethynyl-4,6-androstadiene-17β-ol-3-one acetate.
10. 6 - fluoro - 17α - chloroethynyl-1,4,6-androstatriene-17β-ol-3-one acetate.
11. 6 - fluoro - 17α - bromoethynyl-1,4,6-androstatriene-17β-ol-3-one acetate.
12. 6α - fluoro - 17α - chloroethynyl - 4-androstene-17β-methoxy-3-one.
13. 6α - fluoro - 17α - bromoethynyl - 4-androstene-17β-methoxy-3-one.
14. 6α - fluoro - 17α - chloroethynyl-1,4-androstadiene-17β-methoxy-3-one.
15. 6α-fluoro-17α-bromoethynyl-1,4-androstadiene-17β-methoxy-3-one.
16. 6-fluoro-17α-chloroethynyl-4,6-androstadiene-17β-methoxy-3-one.
17. 6-fluoro-17α-bromoethynyl-4,6-androstadiene-17β-methoxy-3-one.
18. 6 - fluoro - 17α-chloroethynyl-1,4,6-androstatriene-17β-methoxy-3-one.
19. 6 - fluoro - 17α-bromoethynyl-1,4,6-androstatriene-17β-methoxy-3-one.
20. A steroid having the following structural formula:

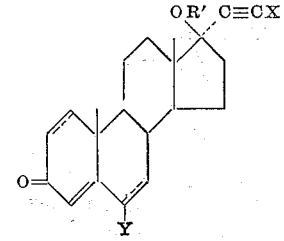

wherein the broken lines between carbon atoms 1 and 2 and between carbon atoms 6 and 7 indicate that a double bond may be present in these positions, and wherein R' is selected from the group consisting of hydrogen, lower alkanoyl and lower alkyl, X is selected from the group consisting of chloro or bromo and Y is selected from the group consisting of hydrogen, fluoro, chloro or bromo.

21. 6α-chloro-17α-chloroethynyl-19-nor-4-androstene-17β-ol-3-one 17-acetate.
22. 6α-chloro-17α-bromoethynyl-19-nor-4-androstene-17β-ol-3-one 17-acetate.
23. 6α - fluoro-17α-chloroethynyl-19-nor-4-androstene-17β-ol-3-one 17-acetate.
24. 6α - fluoro-17α-bromoethynyl-19-nor-4-androstene-17β-ol-3-one 17-acetate.
25. 17α - chloroethynyl-19-nor-3,5-androstadiene-17β-methoxy-3-ol 3-acetate.
26. 17α - bromoethynyl-19-nor-3,5-androstadiene-17β-methoxy-3-ol 3-acetate.
27. 6α - fluoro-17α-chloroethynyl-19-nor-4-androstene-17β-methoxy-3-one.
28. 6α - fluoro-17α-bromoethynyl-19-nor-4-androstene-17β-methoxy-3-one.
29. 6α - chloro-17α-chloroethynyl-19-nor-4-androstene-17β-methoxy-3-one.
30. 6α-chloro-17α-bromoethynyl-19-nor-4-androstene-17β-methoxy-3-one.

No references cited.